(12) United States Patent
Achiwa

(10) Patent No.: US 8,587,795 B2
(45) Date of Patent: Nov. 19, 2013

(54) IMAGE FORMING APPARATUS, IMAGE FORMING SYSTEM, METHOD FOR CONTROLLING THE IMAGE FORMING APPARATUS, AND STORAGE MEDIUM

(75) Inventor: Ken Achiwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 916 days.

(21) Appl. No.: 12/507,609

(22) Filed: Jul. 22, 2009

(65) Prior Publication Data
US 2010/0020345 A1 Jan. 28, 2010

(30) Foreign Application Priority Data

Jul. 23, 2008 (JP) ................................. 2008-189548

(51) Int. Cl.
*G06K 15/02* (2006.01)
(52) U.S. Cl.
USPC ......... 358/1.14; 358/1.15; 358/1.16; 358/403
(58) Field of Classification Search
USPC ................ 358/1.14, 1.15, 1.16, 403; 340/5.2; 713/320
See application file for complete search history.

(56) References Cited

U.S. PATENT DOCUMENTS

| 5,629,981 A * | 5/1997 | Nerlikar ......................... 713/168 |
| 8,239,965 B2 * | 8/2012 | Kubota ............................ 726/28 |
| 2007/0013945 A1 * | 1/2007 | Yoshida et al. ............... 358/1.15 |
| 2008/0117461 A1 * | 5/2008 | Mitsutake et al. ........... 358/1.16 |
| 2008/0181648 A1 * | 7/2008 | Makishima et al. ............. 399/75 |

FOREIGN PATENT DOCUMENTS

| JP | 2005-342964 | 12/2005 |
| JP | 2008165540 A * | 7/2008 |

* cited by examiner

*Primary Examiner* — Allen H Nguyen
(74) *Attorney, Agent, or Firm* — Canon USA, Inc., IP Division

(57) ABSTRACT

A method is provided for controlling an image forming apparatus provided in a room managed by a management apparatus capable of managing an entry or exit state of a participant who attends a conference and configured to process a print job received from a client computer. The method includes determining whether the room is used by a participant of a conference relating to the print job transmitted from the client computer, outputting the print job in a case where it is determined that the room is used by the participant of the conference relating to the print job, and restricting an output of the print job in a case where it is determined that the room is not used by the participant of the conference relating to the print job.

12 Claims, 27 Drawing Sheets

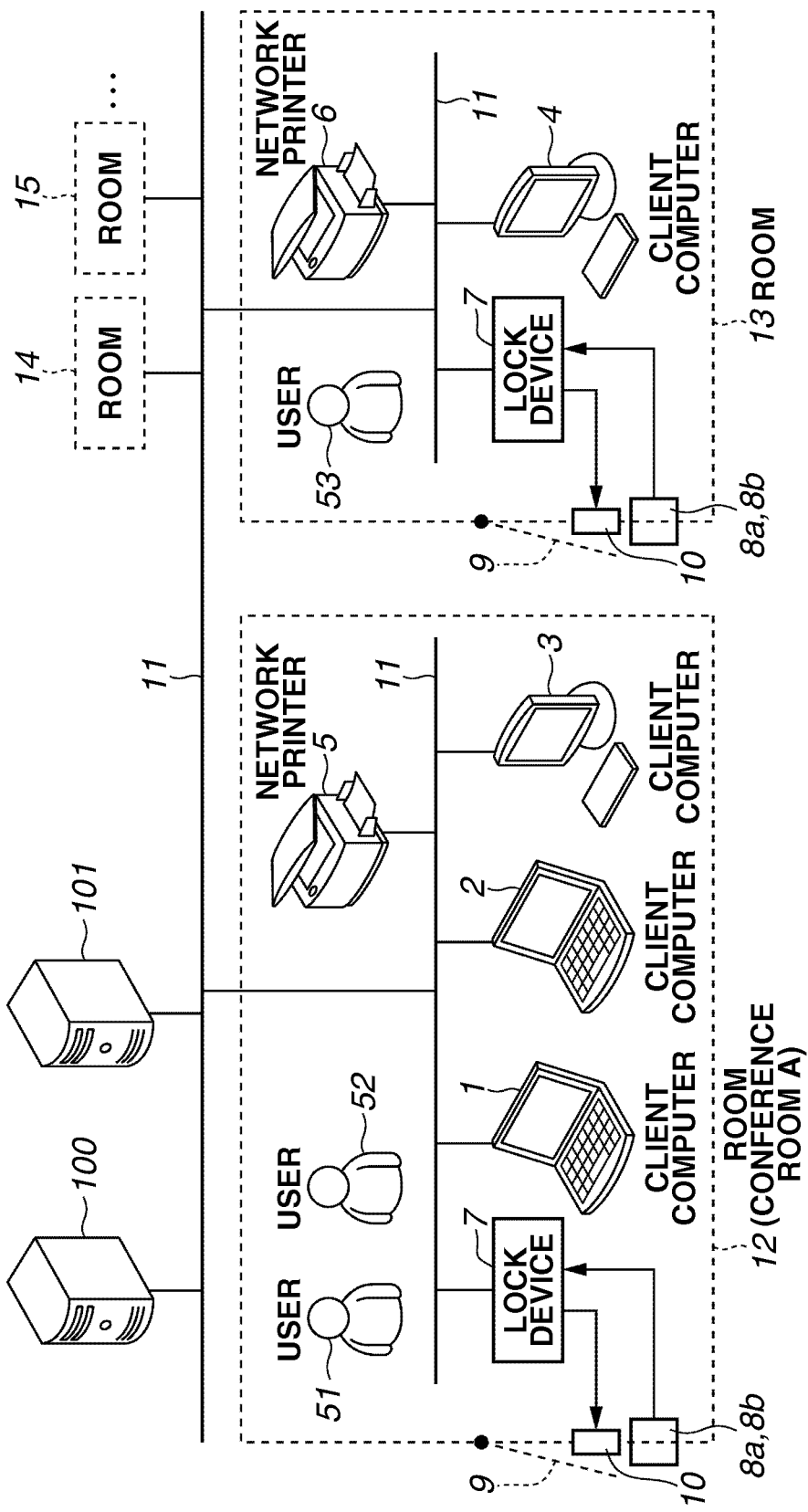

FIG.2A
701 USER POSITION INFORMATION TABLE

| USER ID | ENTRY PERMITTED AREA | PRESENT POSITION |
|---|---|---|
| 10001 | CONFERENCE ROOM A, OFFICE A, HALL,... | CONFERENCE ROOM A |
| 10002 | CONFERENCE ROOM A, OFFICE B, RECEPTION ROOM,... | OFFICE B |
| 10003 | CONFERENCE ROOM A, OFFICE C,... | UNKNOWN |
| ... | ... | UNKNOWN |

FIG.2B
702 LOCK DEVICE ID TABLE

| PLACE | LOCK DEVICE ID |
|---|---|
| CONFERENCE ROOM A | CONFERENCE ROOM A LOCK DEVICE (ID = XXXXXX) |
| CONFERENCE ROOM B | ... |

FIG.2C
703 GROUP MEMBER ID TABLE

| GROUP MEMBER LIST | GROUP MEMBER ID |
|---|---|
| GROUP 1 MEMBER LIST (list-1000x@xxxxx.co.jp) | 10001(10001@xxxxx.co.jp)<br>10002(10002@xxxxx.co.jp)<br>10003(10003@xxxxx.co.jp)<br>10004(10004@xxxxx.co.jp)<br>10005(10005@xxxxx.co.jp) |
| GROUP 2 MEMBER LIST (list-2000x@xxxxx.co.jp) | 20001(20001@xxxxx.co.jp)<br>20002(20002@xxxxx.co.jp)<br>20003(20003@xxxxx.co.jp)<br>20004(20004@xxxxx.co.jp) |
| GROUP 3 MEMBER LIST (list-3000x@xxxxx.co.jp) | ... |

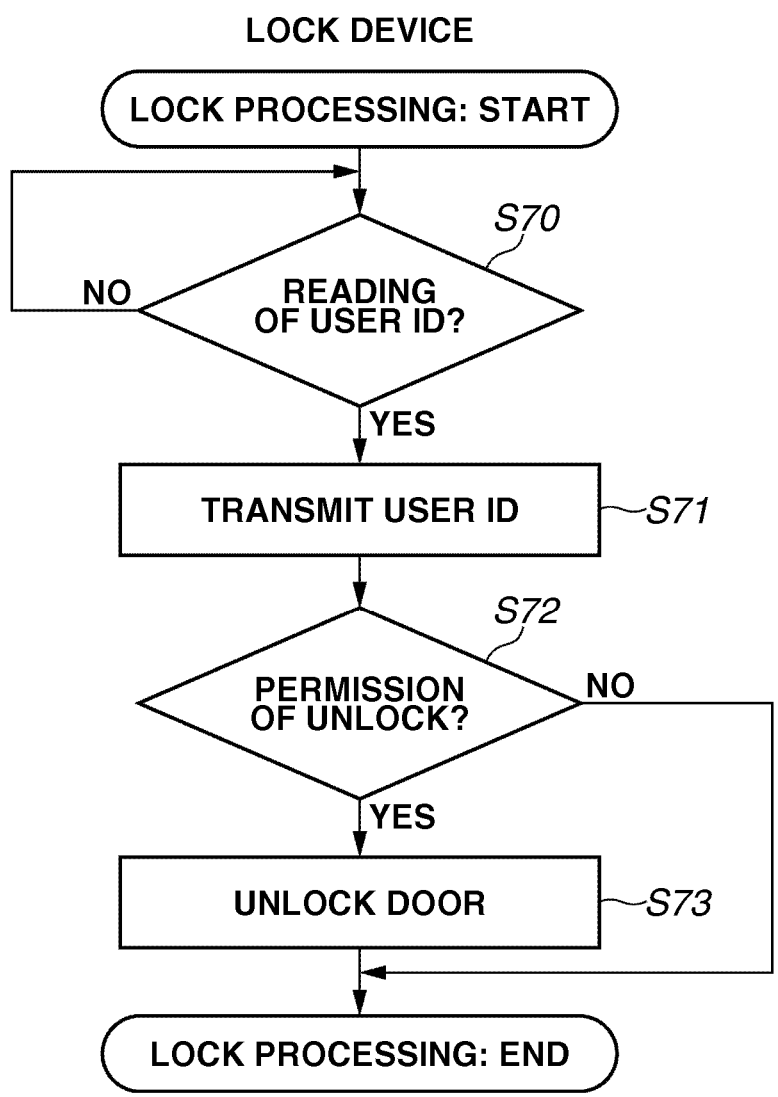

CLIENT COMPUTER

CLIENT COMPUTER

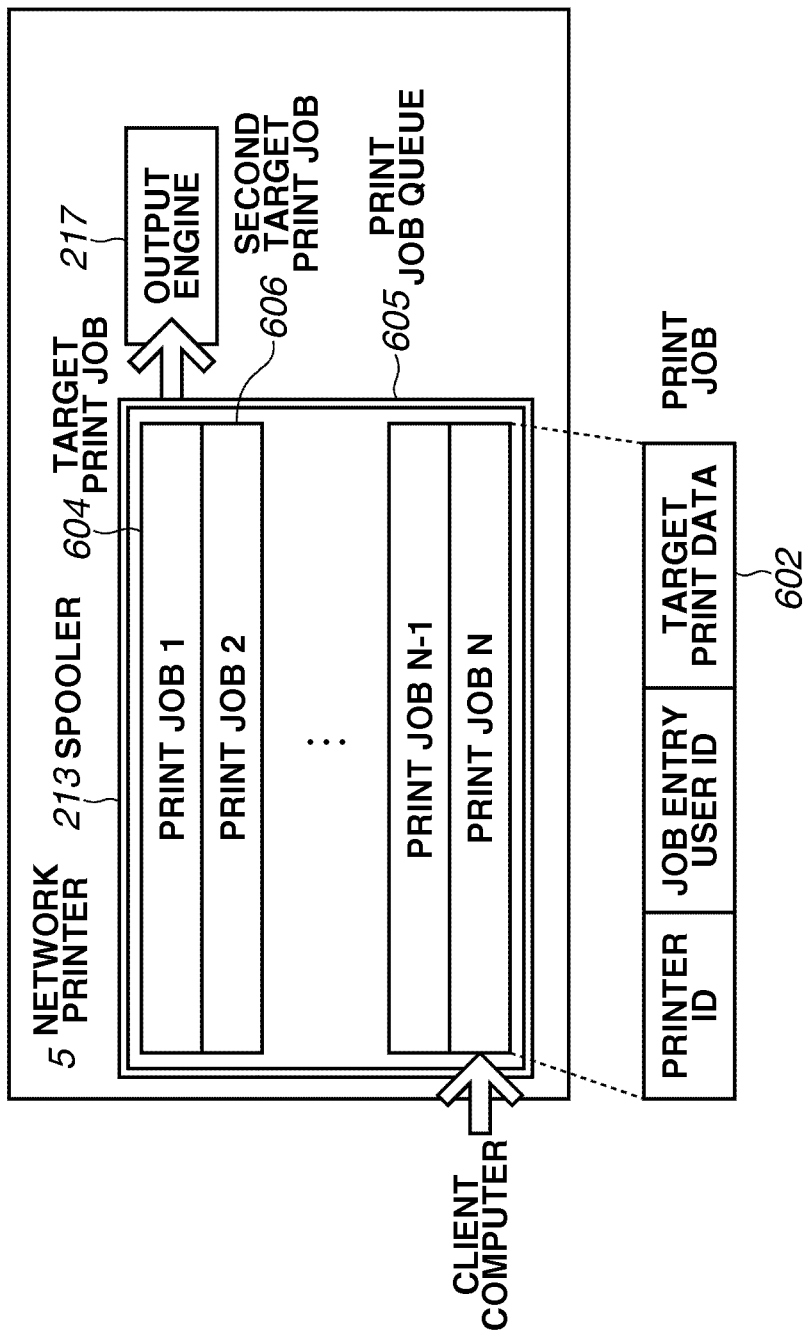

| PLACE | TIME PERIOD | USAGE PERMITTED USER ID LIST |
|---|---|---|
| CONFERENCE ROOM A | 13:00 - 15:00 | GROUP 1 MEMBER LIST (10001, 10002, 10003, 10004, 10005) |

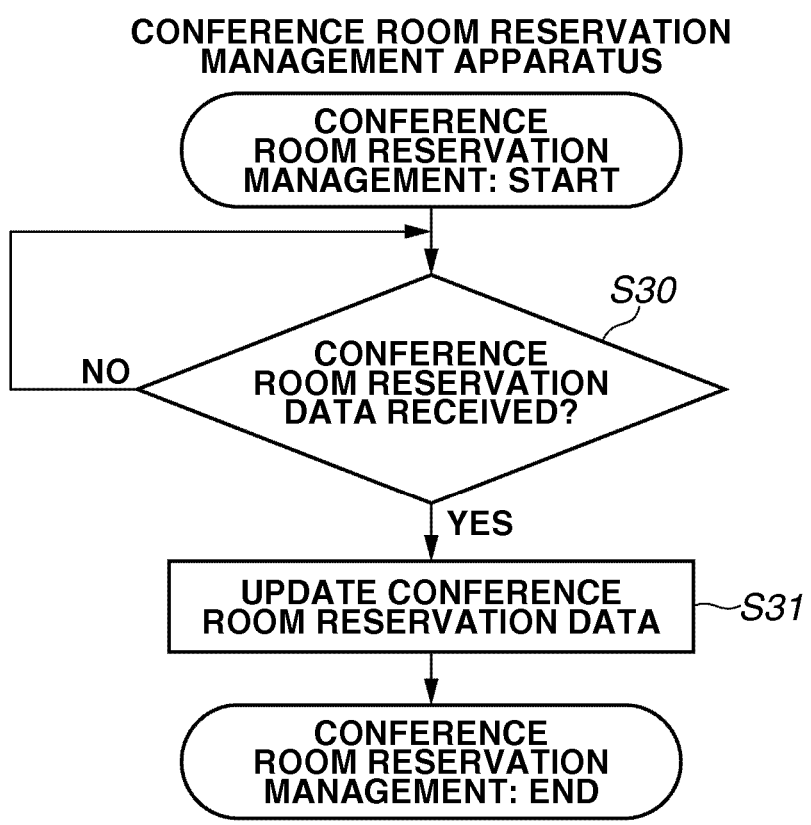

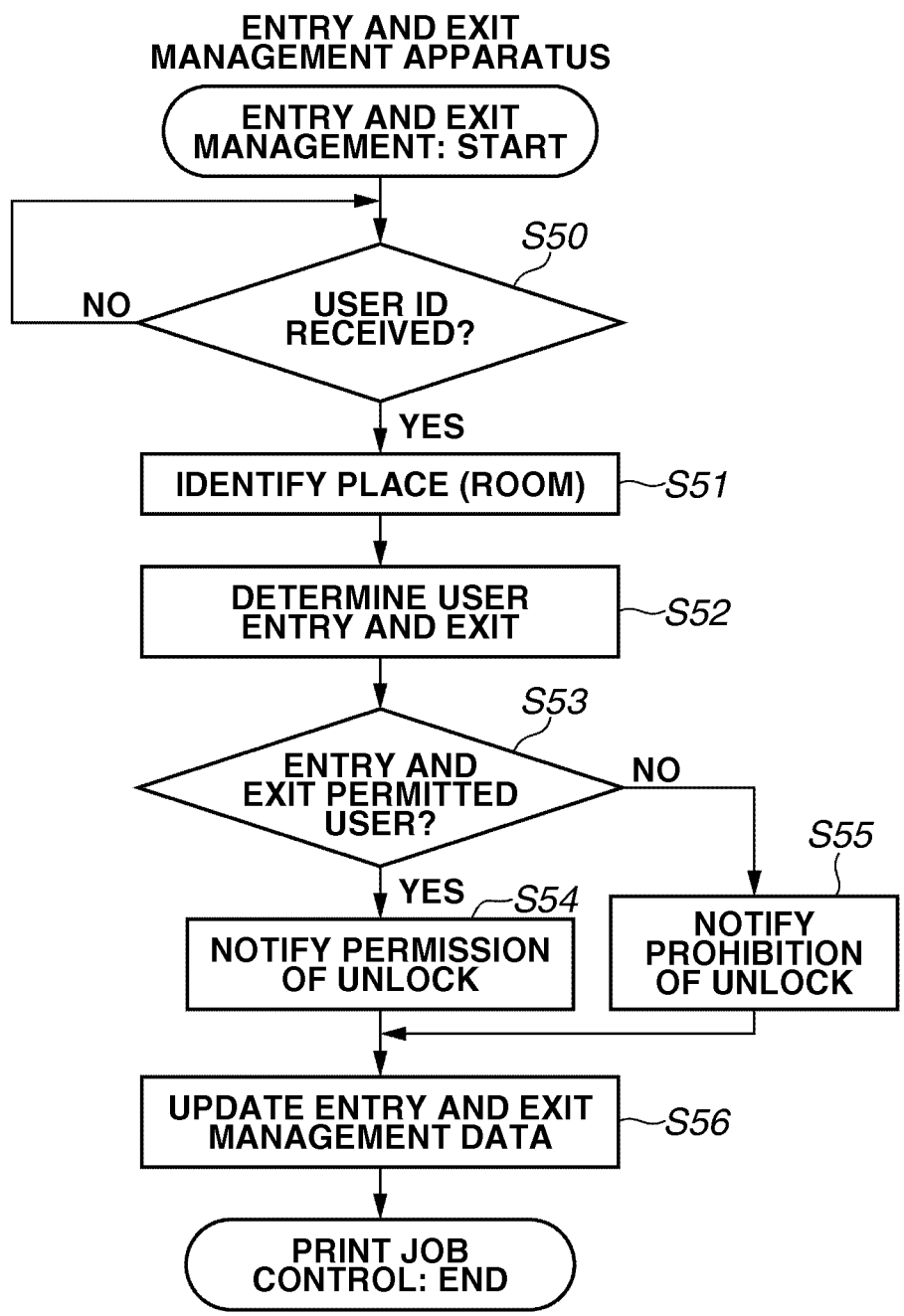

FIG.21

FD/CD-ROM OR COMPARABLE STORAGE MEDIUM

| DIRECTORY INFORMATION |
|---|
| PROGRAM CODE CORRESPONDING TO STEPS IN FLOWCHART OF FIG. 10 |
| PROGRAM CODE CORRESPONDING TO STEPS IN FLOWCHART OF FIG. 11A |
| PROGRAM CODE CORRESPONDING TO STEPS IN FLOWCHART OF FIG. 11B |
| PROGRAM CODE CORRESPONDING TO STEPS IN FLOWCHART OF FIG. 13A |
| PROGRAM CODE CORRESPONDING TO STEPS IN FLOWCHART OF FIG. 13B |
| PROGRAM CODE CORRESPONDING TO STEPS IN FLOWCHART OF FIG. 17A |
| PROGRAM CODE CORRESPONDING TO STEPS IN FLOWCHART OF FIG. 17B |
| PROGRAM CODE CORRESPONDING TO STEPS IN FLOWCHART OF FIG. 18A |
| PROGRAM CODE CORRESPONDING TO STEPS IN FLOWCHART OF FIG. 18B |

IMAGE FORMING APPARATUS, IMAGE FORMING SYSTEM, METHOD FOR CONTROLLING THE IMAGE FORMING APPARATUS, AND STORAGE MEDIUM

BACKGROUND OF THE INVENTION

1. Field of the Invention

The present invention relates to an image forming apparatus, an image forming system, a method for controlling the image forming apparatus, and a storage medium.

2. Description of the Related Art

Conventionally, an image forming system enables a user to transmit print data to a multifunction peripheral (MFP), which is an example of an image forming apparatus, from a client computer.

If a setup place of the MFP is a conference room, the MFP may be used by numerous users who are different depending on time. Therefore, it is important to ensure the security of a print product to be printed by the MFP. For example, as discussed in Japanese Patent Application Laid-Open No. 2005-342964, there is a conventional method using an entry and exit management server that can ensure the security of a print product to be printed by an MFP in a conference room. According to the method, the entry and exit management server manages users present in a room (i.e., a setup place of the MFP) and causes the MFP to perform a print output operation only when a user who has transmitted a print job from a client computer is present in the room. On the other hand, if the user who has transmitted the print job from the client computer is absent in the room, the entry and exit management server prevents the MFP from executing the print output operation to secure the security.

However, according to the method discussed in Japanese Patent Application Laid-Open No. 2005-342964, if a user transmits a print job from the outside of the conference room, the MFP does not start a print output operation until the user who has transmitted the print job enters the conference room (i.e., the setup place of the MFP). Therefore, if the number of copies to be output according to the print job is large, a user is kept waiting for a relatively longer time to obtain an output of a print product after the user enters the conference room.

SUMMARY OF THE INVENTION

Exemplary embodiments of the present invention are directed to a technique capable of overcoming or at least mitigating the above-described problems.

According to an aspect of the present invention, at least one exemplary embodiment is directed to an image forming apparatus provided in a room managed by a management apparatus capable of managing an entry or exit state of a participant who attends a conference and is configured to process a print job received from a client computer. The image forming apparatus includes a determining unit configured to determine whether the room is used by a participant of a conference relating to the print job transmitted from the client computer, and an output control unit configured to output the print job in a case where the determining unit determines that the room is used by the participant of the conference relating to the print job and configured to restrict an output of the print job in a case where the determining unit determines that the room is not used by the participant of the conference relating to the print job.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 1 illustrates a configuration of a network printing system according to an exemplary embodiment of the present invention.

FIG. 2A illustrates an example of a user position information table that can be managed by an entry and exit management apparatus illustrated in FIG. 1.

FIG. 2B illustrates an example of a lock device ID table that can be managed by the entry and exit management apparatus illustrated in FIG. 1.

FIG. 2C illustrates an example of a group member ID table that can be managed by the entry and exit management apparatus illustrated in FIG. 1, in which a single group list name is allocated to a set of a plurality of user IDs.

FIG. 10 is a flowchart illustrating example processing that can be executed by the lock device illustrated in FIG. 1.

FIG. 12 illustrates a configuration of a print job that may be held by the network printer illustrated in FIG. 1.

FIG. 17A is a flowchart illustrating an example procedure of data processing that can be executed by a conference reservation management apparatus illustrated in FIG. 1.

FIG. 18A is a flowchart illustrating an example procedure of data processing that can be executed by the entry and exit management apparatus illustrated in FIG. 1.

FIG. 21 illustrates a memory map of a storage medium that stores various data processing programs that can be read by an information processing apparatus according to an exemplary embodiment of the present invention.

DETAILED DESCRIPTION OF THE EMBODIMENTS

Figure 3:
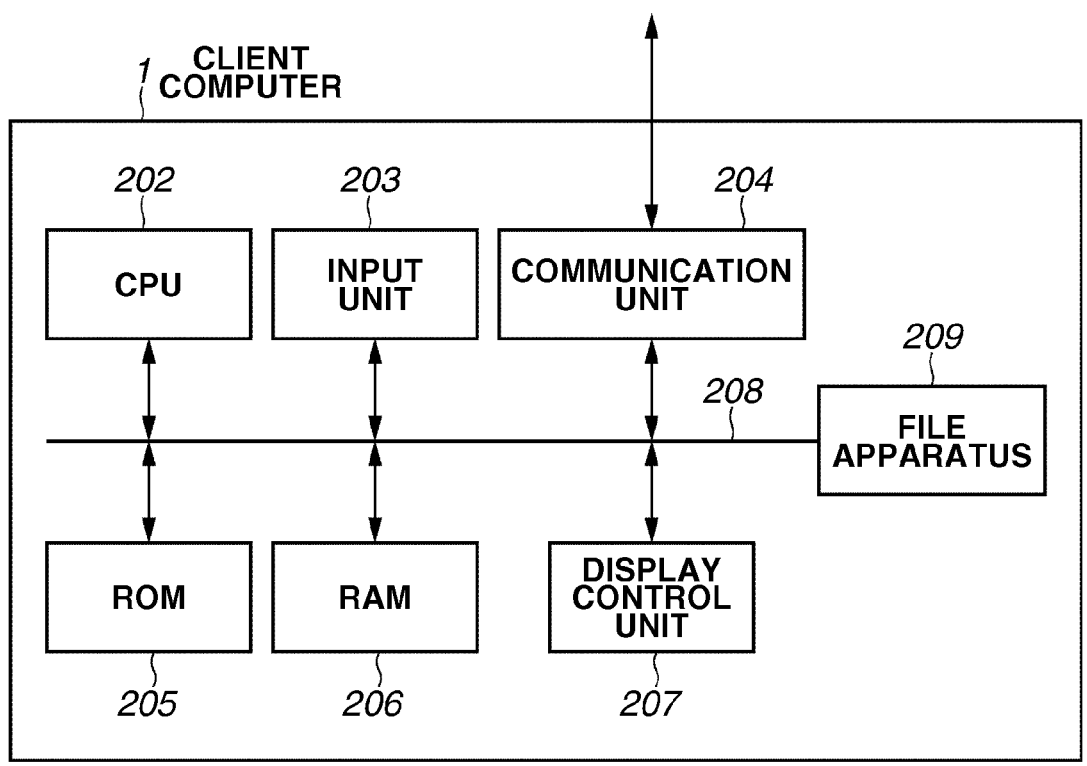
FIG. 3 is a block diagram illustrating a configuration of a client computer illustrated in FIG. 1.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Various exemplary embodiments, features, and aspects of the invention will be described in detail below with reference to the drawings.

FIG. 1 illustrates a configuration of a network printing system as an example of an image forming system according to an exemplary embodiment of the present invention. The image forming system includes a conference room reservation management apparatus 100, an entry and exit management apparatus 101, a plurality of network printers 5 and 6, and card readers 8a and 8b. The conference room reservation management apparatus (i.e., a conference room reservation management server) 100 and the entry and exit management apparatus (i.e., an entry and exit management server) 101 are connected to a local area network provided in respective rooms 12, 13, 14, and 15. The conference room reservation management apparatus 100 and the entry and exit management apparatus 101 can manage a reservation status and a usage status of respective rooms 12, 13, 14, and 15.

As illustrated in FIG. 1, the network printing system can be installed for a plurality of rooms 12, 13, 14, 15 . . . . It is now assumed that the room 12 is a conference room that may be occupied (or used) by users who made a reservation beforehand for a specific time period. In the present exemplary embodiment, the room 12 is referred to as a conference room A.

The room 12 includes client computers 1 to 3 (e.g., personal computers) that can generate print data. The personal computers can function as an information processing apparatus according to an exemplary embodiment of the present invention. The room 12 further includes the network printer 5 that can serve as a printing apparatus connected to a network 11. The network printer 5 is an example of an image forming apparatus according to an exemplary embodiment of the present invention. The room 12 further includes a lock device 7 that can permit/prohibit the entry and exist to and from the room 12. The network 11 connects the client computers 1 to 3, the network printer 5, and the lock device 7.

Users 51 and 52 are conference participants who are currently present in the conference 12. The entry and exit management apparatus 101 can manage a state of entry and a state of exit of a user using the room 12. The lock device 7 includes a door lock 10 that can lock/unlock a door 9 and card readers 8a and 8b provided in the vicinity of the door 9. The card reader 8a is an outdoor card reader. The card reader 8b is an indoor card reader. The door 9 is configured to hold a locked state unless an authorized IC card is located in the vicinity of the card readers 8a and 8b.

Each of the users 51 to 53 carries an IC card that stores user ID information (i.e., information to be used to identify the user).

To enter the conference room A, the users 51 to 53 are required to present their IC cards to the outdoor card reader 8a that performs reading processing. To exit from the conference room A, the users 51 to 53 are required to present their IC cards to the indoor card reader 8b that performs reading processing. When the card readers 8a and 8b complete the IC card reading processing, the lock device 7 transmits the read user ID information and lock device information to the entry and exit management apparatus 101. The lock device information can be used to identify the lock device 7 of the conference room A that has read the ID information.

The entry and exit management apparatus 101 determines whether the user having the received ID information is permitted to enter and exit the room corresponding to the received lock device information. If the user is permitted to enter and exit the conference room A, the entry and exit management apparatus 101 instructs the lock device 7 of the conference room A via the network 11 to release the door 9 from a locked state. The lock device 7 unlocks the door 9. The IC card that stores the user ID information is not limited to a contact type IC card and can be a non-contact type IC card.

The users 51 to 53 are registered in the conference room reservation management apparatus 100 as conference participants who attend the same meeting. Therefore, if the users 51 and 52 are present in the room 12 (i.e., the conference room A) in a time period reserved by the users 51 to 53, an input print job can be output from the network printer 5.

Although the conference room reservation management apparatus 100 and the entry and exit management apparatus 101 are explicitly separated in FIG. 1, two management apparatuses 100 and 101 can be integrated as a single management apparatus (i.e., a server). In this case, a central processing unit (i.e., CPU) of the single management apparatus can execute processing of the conference room reservation management apparatus 100 and the entry and exit management apparatus 101 according to a program stored in a memory of the management apparatus, as described below in detail in the present exemplary embodiment.

The entry and exit management apparatus 101 stores information tables illustrated in FIGS. 2A to 2C. FIG. 2A illustrates an example user position information table 701 that can be managed by the entry and exit management apparatus 101 illustrated in FIG. 1. FIG. 2B illustrates an example lock device ID table 702 that can be managed by the entry and exit management apparatus 101 illustrated in FIG. 1. FIG. 2C illustrates an example group member ID table 703 that can be managed by the entry and exit management apparatus 101 illustrated in FIG. 1, in which a single group list name is allocated to a set of a plurality of user IDs.

More specifically, the entry and exit management apparatus 101 refers to the user position information table 701 illustrated in FIG. 2A to manage, for each user ID, entry permitted room information (i.e., room ID) and information indicating the present position. The entry and exit management apparatus 101 further refers to the lock device ID table 702 illustrated in FIG. 2B to control a lock device of each room via the network. The entry and exit management apparatus 101 further refers to the group member ID table 703 illustrated in FIG. 2C to manage a set of a plurality of user IDs to which the same group list name is allocated.

As described above, to enter the room 12, the users 51 and 52, 53 are required to present their IC cards to the outdoor card reader 8a that performs reading processing.

If the entry and exit management apparatus 101 receives ID information and lock device information from the lock device 7 installed in the room 12, the entry and exit management apparatus 101 refers to the lock device ID table 702 to check the room corresponding to the lock device 7 that has transmitted the ID information and the lock device information. Then, the entry and exit management apparatus 101 identifies a room ID.

Then, the entry and exit management apparatus 101 refers to the user position information table 701 illustrated in FIG. 2A to determine whether a user having the user ID received from the lock device 7 is permitted to enter the room identified by the room ID. If it is determined that the user is permitted to enter the room, the entry and exit management apparatus 101 transmits unlock permission information to the lock device 7 (i.e., a transmission source) to cause the door lock 10 to unlock the door 9.

In this case, if the outdoor card reader 8a of the room 12 completes reading of the IC card inserted by the user, the entry and exit management apparatus 101 can determine that the user identified by the user ID has entered the room 12. Therefore, the entry and exit management apparatus 101 updates the user position information table 701 illustrated in FIG. 2A by inputting the room ID of the room 12 in a "present position" field.

If the indoor card reader 8b completes reading of the IC card, it can be presumed that the user has exit the room. Therefore, the entry and exit management apparatus 101 updates the user position information table 701 by inputting "unknown" in the "present position" field.

In a case where the card reader reads an IC card of a user who is not permitted to enter the room, the entry and exit management apparatus 101 does not transmit the unlock permission information to the lock device 7. Alternatively, the entry and exit management apparatus 101 can transmit lock holding information to the lock device 7. In this case, the lock device 7 can notify occurrence of an error with a buzzer to hold the door lock 7 in a locked state.

The client computers 1 to 3 in the room 12 and a client computer 4 in another room 13 have a configuration illustrated in FIG. 3 to generate print data and perform transmission/reception of various data. The client computers 1 to 4 are similar in configuration and therefore descriptions for the client computers 2 to 4 are not repeated.

FIG. 3 is a block diagram illustrating a configuration of the client computer 1 illustrated in FIG. 1.

In FIG. 3, a CPU 202 can control devices connected to a bus 208 to perform an overall control for the apparatus. An input unit 203 can input data that may be used for the processing by the client computer 1. A keyboard or a pointing device can serve as the input unit 203.

A communication unit (i.e., a network interface) 204 can communicate with the entry and exit management apparatus 101, the conference room reservation management apparatus 100, the network printers 5 and 6, and client computers in another rooms via the network 11 illustrated in FIG. 1.

A read only memory (i.e., ROM) 205 can store a boot program and a basic input/output system (i.e., BIOS). A random access memory (RAM) 206 can be used as a work area for the CPU 202.

A display control unit 207 can perform processing for rendering image data on a built-in video memory under the control of the CPU 202 and can output the rendering data as a video signal to a display unit, such as a cathode ray tube (CRT) apparatus or a liquid crystal display device associated to the client computer 1.

A file apparatus 209 includes a hard disk that can store processing information files and program files (including OS and document editing application programs).

The communication unit 204 performs protocol conversion for the data output from the client computer 1 and the data input to the client computer 1, to enable the client computer 1 to realize data transmission/reception via the network 11.

If a power source of the client computer 1 having the above-described configuration is turned on, the CPU 202 reads the OS from the file apparatus 209 and loads it into the RAM 206 according to the boot program stored in the ROM 205 and initializes the hardware. Then, the CPU 202 functions as a client computer capable of performing editing processing and print processing according to various applications that can be loaded into the RAM 206.

An example configuration of the network printer 5 in the room 12 is described below with reference to FIG. 4. The network printer 6 in the room 13 has a configuration similar to that of the network printer 5.

Figure 4:
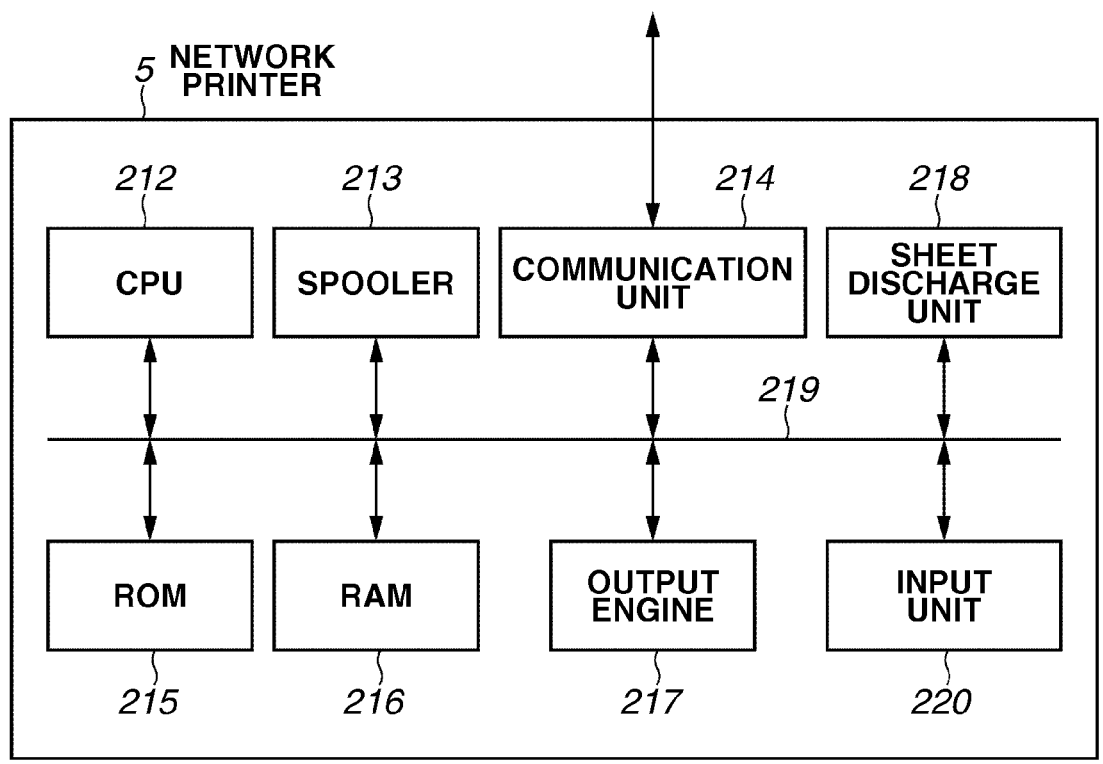
FIG. 4 is a block diagram illustrating a configuration of a network printer illustrated in FIG. 1.

FIG. 4 is a block diagram illustrating a configuration of the network printer 5 illustrated in FIG. 1.

In FIG. 4, a CPU 212 controls various operations to be performed by the network printer 5 that includes the following devices connected to a bus 219. A spooler 213 can manage a storage apparatus (e.g., a hard disk) that has a relatively large capacity to store print jobs and can manage respective jobs.

A communication unit (i.e., a network interface) 214 can communicate with other apparatuses connected to the network 11. A ROM 215 can store processing programs and font data that are required to cause the apparatus to function as a network printer. A RAM 216 can be used as a work area or a buffer, and also can be used to rasterize a print image.

An output engine 217 can output an image on a recording medium (e.g., a sheet) that can be supplied from a cassette (not illustrated). A sheet discharge unit 218 can perform processing for discharging a printed sheet (i.e., a print product) subjected to a print output operation by the output engine 217 to a discharge tray (not illustrated).

An input unit 220 can function as an operation panel that includes a display unit equipped with a touch panel and various input switches.

The communication unit 214 performs protocol conversion for the data output from the network printer 5 and the data input to the network printer 5, to enable the network printer 5 to realize data communication with the client computers 1, 2, 3, and 4 via the network 11.

The output engine 217 includes an inkjet or a laser beam printing unit that can perform print output processing under the control of the CPU 212. However, the present invention is not limited to a specific printing method or system.

Next, a configuration of the conference room reservation management apparatus 100 is described below with reference to FIG. 5.

Figure 5:
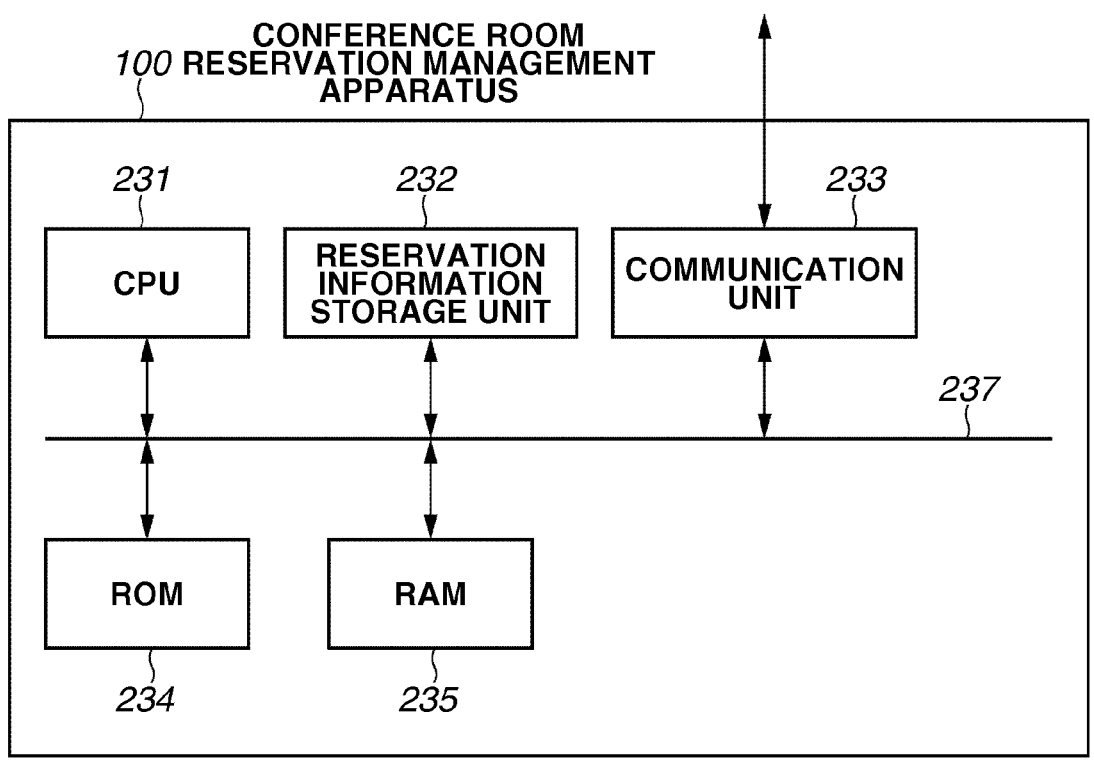
FIG. 5 is a block diagram illustrating a configuration of a conference room reservation management apparatus illustrated in FIG. 1.

FIG. 5 is a block diagram illustrating a configuration of the conference room reservation management apparatus 100 illustrated in FIG. 1.

In FIG. 5, a CPU 231 can control the following devices connected to a bus 237. A reservation information storage unit 232 can store information relating to a user who has made a reservation for the conference room.

A communication unit (i.e., a network interface) 233 can perform communications with other apparatuses connected to the network 11. A read only memory (ROM) 234 can store a conference room reservation control program. A random access memory (RAM) 235 can function as a work area for the CPU 231.

Figure 6:
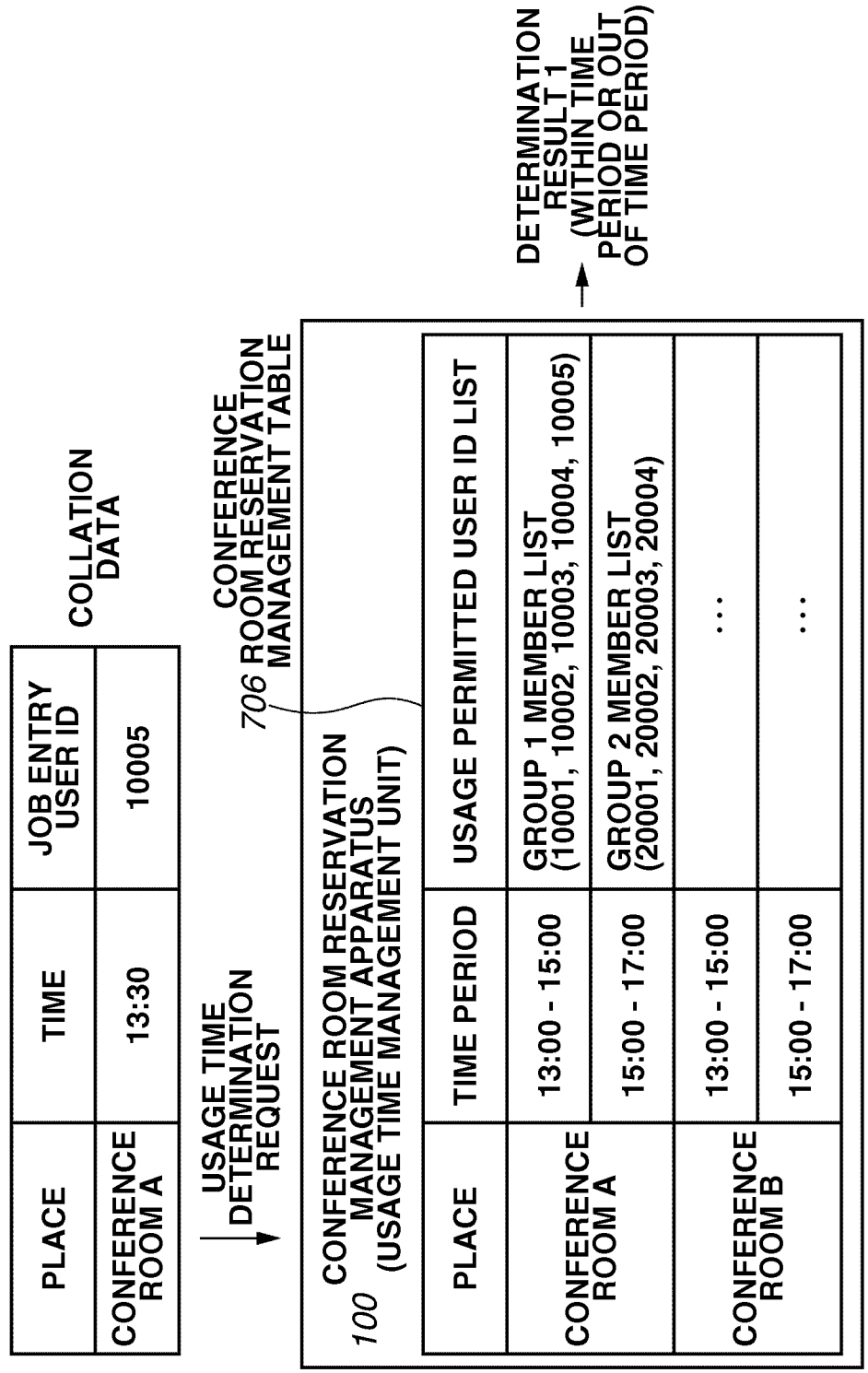
FIG. 6 illustrates an example of a conference room reservation management table that can be managed by the conference room reservation management apparatus illustrated in FIG. 1.

The reservation information storage unit 232 can store the conference room reservation management table 706 illustrated in FIG. 6. The reservation information storage unit 232 can be a large-capacity storage apparatus (e.g., a hard disk), for example, when it is used in a company to store and manage information of numerous users, printers, and rooms. Similar to the client computer 1, the conference room reservation management apparatus 100 can be a general information processing apparatus (e.g., a personal computer) In other words, a software program running on a computer can realize conference room reservation management processing according to the present exemplary embodiment.

A configuration of the entry and exit management apparatus 101 is described below with reference to FIG. 7.

Figure 7:
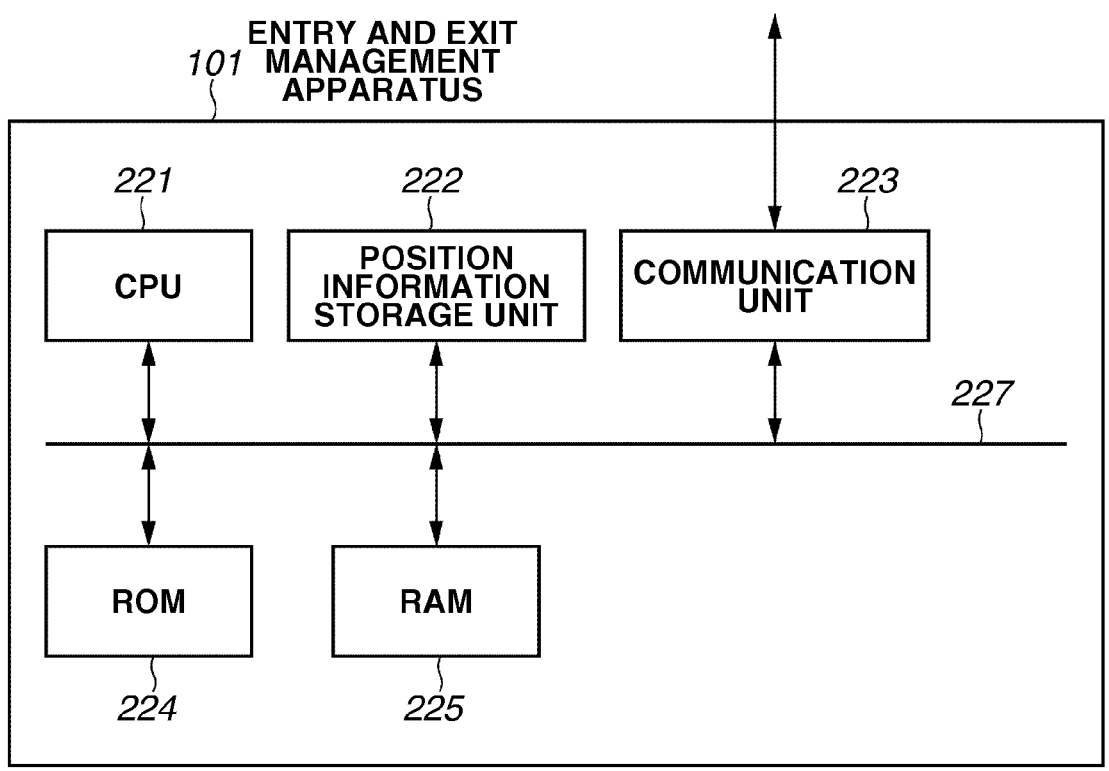
FIG. 7 is a block diagram illustrating a configuration of the entry and exit management apparatus illustrated in FIG. 1.

FIG. 7 is a block diagram illustrating an example configuration of the entry and exit management apparatus 101 illustrated in FIG. 1.

In FIG. 7, a CPU 221 can control the following devices connected to a bus 227. A position information storage unit 222 can store information relating to the present position of each user. A communication unit (i.e., a network interface) 223 can communicate with other apparatuses connected to the network 11. A ROM 224 can store an entry and exit control program. A RAM 225 can be used as a work area for the CPU 221. The position information storage unit 222 can store an entry and exit management table 707 illustrated in FIG. 8.

The conference room entry and exit management table 707 corresponds to the information of the user position information table 701 illustrated in FIG. 2A. The position information storage unit 222 can be a large-capacity storage apparatus (i.e., a hard disk), for example, when it is used in a company to store and manage information of numerous users, printers, and rooms. Similar to the client computer 1, the entry and exit management apparatus 101 can be a general information processing apparatus (e.g., a personal computer) In other words, a software program running on a computer can realize entry and exit management processing according to the present exemplary embodiment.

A configuration of the lock device 7 is described below with reference to FIG. 9.

Figure 9:
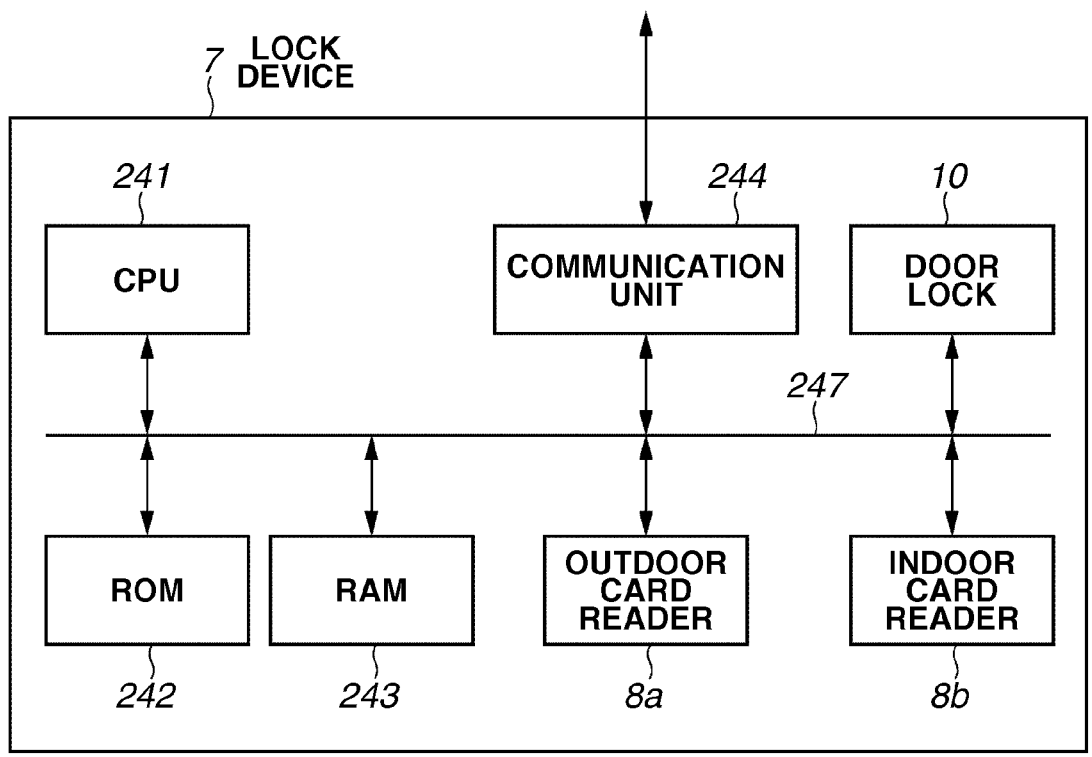
FIG. 9 is a block diagram illustrating a configuration of a lock device illustrated in FIG. 1.

FIG. 9 is a block diagram illustrating an example configuration of the lock device 7 illustrated in FIG. 1, in which components similar to those illustrated in FIG. 1 are denoted by the same reference numerals.

In FIG. 9, a CPU 241 can control the following devices connected to a bus 247. A ROM 242 can store processing programs relating to lock/unlock of the door lock 10, IC card reading processing performed by the outdoor/indoor card readers 8a and 8b, and communications performed via the network. A RAM 243 can be used as a work area for the CPU 241.

A communication unit (i.e., a network interface) 244 can communicate with the devices connected to the network 11. In the present exemplary embodiment, the card readers 8a and 8b can read user IDs from wireless IC cards. The card readers 8a and 8b may be magnetic cards having magnetic recording surfaces. An appropriate configuration can be used to read IC card information.

The above-described apparatuses can perform the following processing.

Example processing that can be performed by the lock device 7 (or by a lock device in another room) is described below with reference to a flowchart illustrated in FIG. 10.

FIG. 10 is a flowchart illustrating example processing that can be executed by the lock device 7 illustrated in FIG. 1, according to which the lock device 7 can lock/unlock a key of the door 9. To execute the processing of steps illustrated in FIG. 10, the CPU 241 illustrated in FIG. 9 executes a control program stored in the ROM 242 that can be loaded into the RAM 243 when it is executed.

In step S70, the CPU 241 determines whether the card reader 8a or 8b reads an IC card. If it is determined that the card reader 8a or 8b performs a reading operation (YES in step S70), the processing proceeds to step S71. In step S71, the CPU 241 transmits the read user ID and the lock device information (i.e., information that can be used to identify a setup place (room) of the lock device 7 that has read the user ID) to the entry and exit management apparatus 101 via the communication unit 244.

As a result, the entry and exit management apparatus 101 transmits unlock permission/prohibition information for the door 9 to the CPU 241.

In step S72, the CPU 241 determines whether the unlock permission information is received from the entry and exit management apparatus 101. If the CPU 241 determines that the unlock permission information is not received from the entry and exit management apparatus 101 (NO in step S72), the CPU 241 terminates the processing of the routine illustrated in FIG. 10. Thus, the door 9 is kept in a closed (locked) state. The user cannot enter the room. In this case, the lock device 7 may notify the user of a message indicating that the user is not permitted to enter the room with a buzzer.

If the CPU 242 determines that the unlock permission information is received from the entry and exit management apparatus 101 (YES in step S72), then in step S73, the CPU 241 causes the lock device 7 to unlock the door 9 for a predetermined time and, if the predetermined time has elapsed, lock the door 9 again. Then, the CPU 241 terminates the processing of the routine illustrated in FIG. 10. If the door 9 is a self-operating door, the CPU 241 controls a driving unit of the door 9 to open the door 9 for a predetermined time and close the door 9 when the predetermined time has elapsed.

Next, example processing that can be executed by the client computer 1 (see FIG. 3) according to an exemplary embodiment is described below with reference to flowcharts illustrated in FIGS. 11A and 11B. The processing can be executed by the client computers 2 and 3 in the same room or the client computer 4 in another room.

Figure 11A:
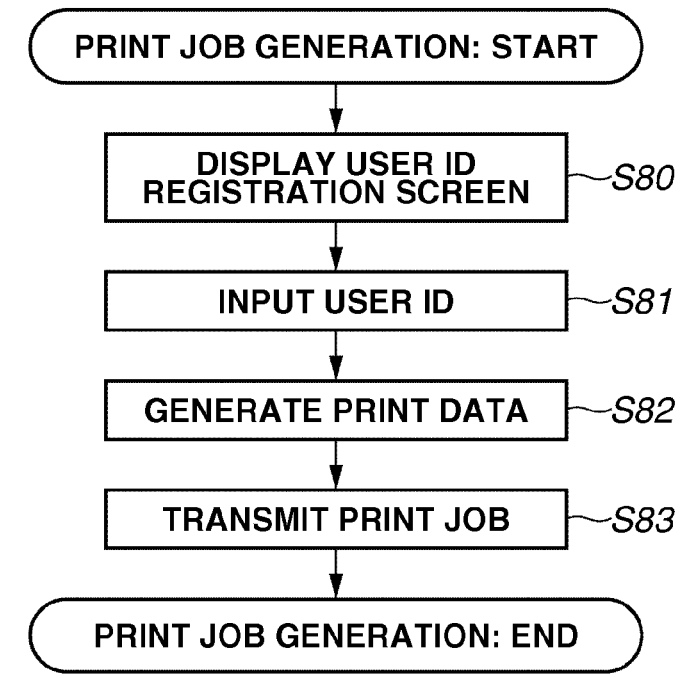
FIG. 11A is a flowchart illustrating an example procedure of data processing that can be executed by a client computer according to an exemplary embodiment of the present invention.

FIG. 11A is a flowchart illustrating an example procedure of data processing that can be executed by an information processing apparatus according to an exemplary embodiment of the present invention. The processing illustrated in FIG. 11A corresponds to print job generation processing that can be executed by the client computer. To realize the processing in steps illustrated in FIG. 11A, the CPU 202 of the client computer can execute a control program stored in the ROM 205 that can be loaded into the RAM 206 when it is executed.

If a user requests to log in the client computer 1, then in step S80, the CPU 202 executes an ID registration program that can be loaded into the RAM 206 and causes the display unit 207 to display an IC card ID registration screen (not illustrated). In step S81, the user inputs an ID number (i.e., user ID) of user's IC card via the input unit 203 while confirming an input content on the displayed screen. The CPU 202 outputs the data of the input ID number to a file in the file apparatus 209.

In this case, the user ID may be input via the keyboard or the card reader. Then, the CPU 202 reads the user ID data, which can be loaded into the RAM 206, from the file including the user ID of the user in the file apparatus 209. In step S82, the CPU 202 executes various applications. If a print instruction is entered by the user via the input unit 203, the CPU 202 generates print data (e.g., page description language) on the RAM 206 so that the generated print data can be processed by the network printer.

In step S83, the CPU 202 adds the user ID to the print data on the RAM 206 to generate print job request data. For example, the added user ID may serve as a header of the print data. Then, the CPU 202 transmits the print job request data to the network printer 5 via the communication unit 204. In the present exemplary embodiment, the print job request data includes print data and an ID number of a transmitter's IC card, as apparent from a print job 602 illustrated in FIG. 12.

FIG. 12 illustrates a configuration of a print job that may be held by the network printer 5 illustrated in FIG. 1. Components similar to those described in FIG. 4 are denoted by the same reference numerals.

As illustrated in FIG. 12, if a print job is newly received, the network printer 5 sets the input print job as the tail of a print job queue 605. Each print job (604, 606, ...) constituting the print job queue 605 includes a printer ID (i.e., an output destination), a job entry user ID, and target print data.

Figure 11B:
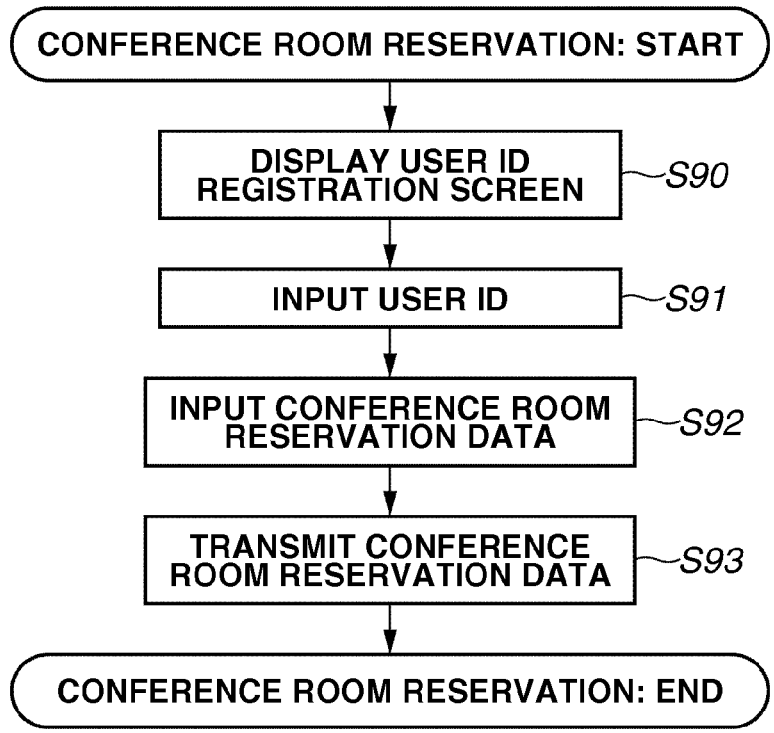
FIG. 11B is a flowchart illustrating an example procedure of data processing that can be executed by a client computer according to an exemplary embodiment of the present invention.

FIG. 11B is a flowchart illustrating an example procedure of data processing that can be executed by an information processing apparatus according to an exemplary embodiment of the present invention. The processing illustrated in FIG. 11B corresponds to conference room reservation processing. To realize the processing of steps illustrated in FIG. 11B, the CPU 202 of the client computer can execute a control program stored in the ROM 205 that can be loaded into the RAM 206 when it is executed.

If a user logs in the client computer 1, then in step S90, the CPU 202 executes the ID registration program that can be loaded into the RAM 206 and causes the display unit 207 to display the IC card ID registration screen (not illustrated). In step S91, the user inputs an ID number (i.e., user ID) of user's IC card via the input unit 203 while confirming an input content on the displayed screen. The CPU 202 outputs the data of the input ID number to a file in the file apparatus 209.

In this case, the user ID may be input via the card reader or the keyboard. Then, the CPU 202 reads the user ID data, which can be loaded into the RAM 206, from the file including the user ID of the user in the file apparatus 209.

In step S92, the CPU 202 executes various applications. If the user inputs conference room reservation information via the input unit 203, the CPU 202 generates reservation data on the RAM 206 so that the generated reservation data can be processed by the conference room reservation management server 100. The user inputs a conference room selected from the rooms 12 to 15 as conference room reservation information, inputs a time period during which the conference room can be used, and inputs members who use the conference room based on a group member list. The CPU 202 generates reservation data on the RAM 206 in association with the room information, the time period information, and the member information that are entered by the user. The reservation data has an arbitrary metadata format.

In step S93, the CPU 202 transmits the reservation data from the RAM 206 to the conference room reservation management server 100 via the communication unit 204. Then, the CPU 202 terminates the processing of the routine illustrated in FIG. 11B. The conference room reservation management server 100 registers the information transmitted from the client computer 1 into the reservation information storage unit 232.

Example processing that can be executed by the network printer 5 (see FIG. 3) according to an exemplary embodiment is described below with reference to flowcharts illustrated in FIGS. 13A and 13B.

Figure 13A:
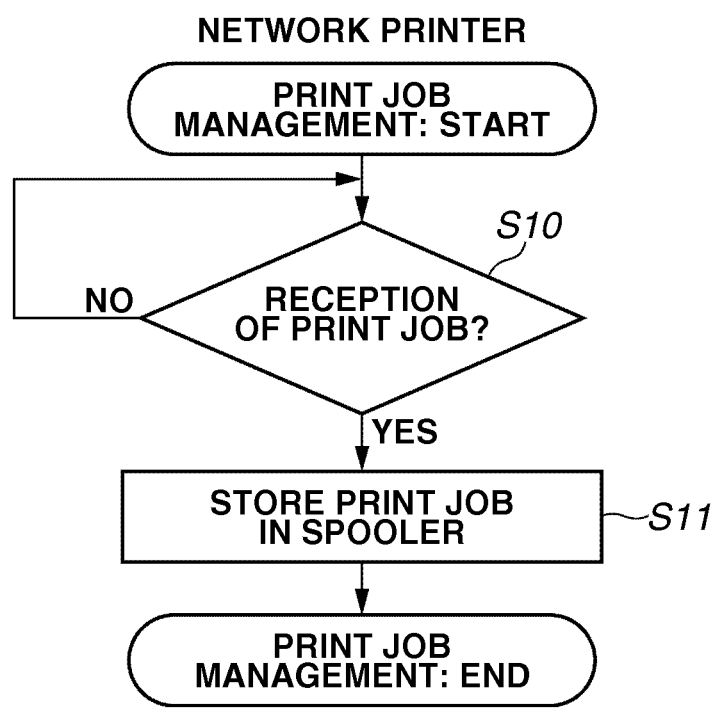
FIG. 13A is a flowchart illustrating an example procedure of data processing that can be executed by the network printer according to an exemplary embodiment of the present invention.

FIG. 13A is a flowchart illustrating an example procedure of data processing that can be executed by an image forming apparatus according to an exemplary embodiment of the present invention. The processing illustrated in FIG. 13A corresponds to print job management processing that can be executed by the network printer 5 illustrated in FIG. 1. To realize the processing in steps illustrated in FIG. 13A, the CPU 212 of the network printer 5 located in the room 12 can execute a control program stored in the ROM 215 that can be loaded into the RAM 216 when it is executed. A CPU of the network printer 6 located in another room can perform similar processing. The CPU 212 of the network printer 5 executes print data reception and print processing according to a program in the ROM 215 to realize a print service operating state. First, print job reception processing to be realized by the network printer 5 is described below.

In step S10, the CPU 212 determines whether a print job is received via the communication unit 214. If the CPU 212 detects a print job that is received, the processing proceeds to step S11. In step S11, the CPU 212 stores the received print job in the spooler 213 according to the reception order. Then, the CPU 212 terminates the processing of the routine illustrated in FIG. 13A. As a result, the spooler 213 can store each input print job according to the reception order, when it is received.

Figure 13B:
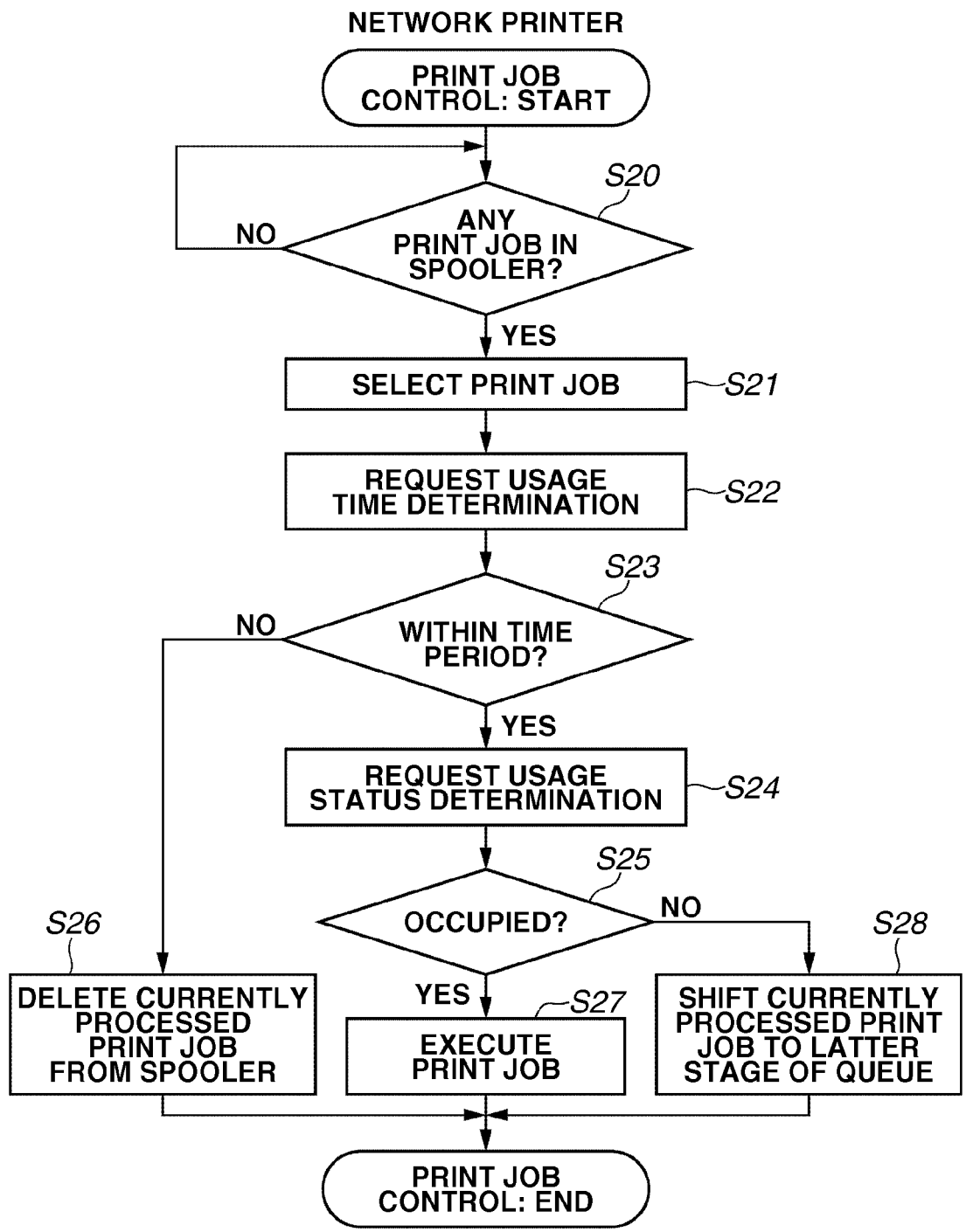
FIG. 13B is a flowchart illustrating an example procedure of data processing that can be executed by the network printer according to an exemplary embodiment of the present invention.

FIG. 13B is a flowchart illustrating an example procedure of data processing that can be executed by the network printer 5 according to an exemplary embodiment of the present invention. The processing illustrated in FIG. 13B corresponds to print job management processing and print job output control that can be executed by the network printer 5 illustrated in FIG. 1. To realize the processing in steps illustrated in FIG. 13A, the CPU 212 of the network printer 5 can execute a control program stored in the ROM 215 that can be loaded into the RAM 216 when it is executed. The CPU of the network printer 6 located in another room can perform similar processing.

In step S20, the CPU 212 determines whether there is any incomplete print job (or an unprocessed print job) in a queue of print jobs stored in the spooler 213. If the CPU 212 determines that an incomplete print job is present (YES in step S20), then in step S21, the CPU 212 selects a leading print job (i.e., the head of the queue). As apparent from the following description, if the selected print job is not in a printable status, the CPU 212 selects the next print job. After the final print job of the queue is selected, the CPU 212 repeats selecting a print job from the head of the queue.

If a print job is selected, the network printer 5 generates collation data to inquire the conference room reservation management apparatus 100 and the entry and exit management apparatus 101 about output permission/prohibition of the selected print job.

Figure 14:
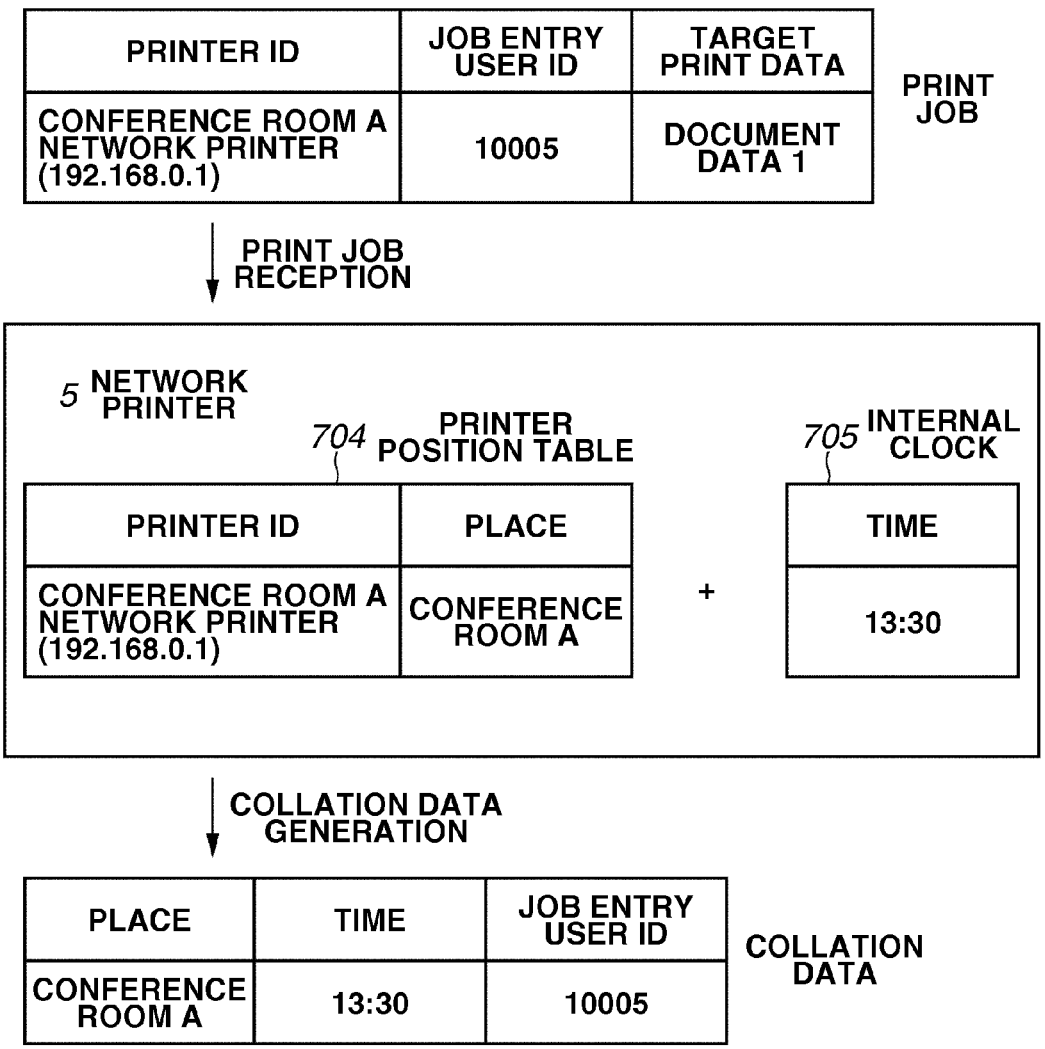
FIG. 14 illustrates an example of collation data that can be generated by the network printer illustrated in FIG. 1.

In the following description, it is assumed that the CPU 212 of the network printer 5 can identify the place where the CPU 212 is present (i.e., the conference room A) by referring to the printer position table 704 stored beforehand in the RAM 216 of the network printer 5 (see FIG. 14).

The conference room reservation management apparatus 100 and the entry and exit management apparatus 101 may store information comparable to the printer position table 704. In this case, if the position information indicating a position (e.g., conference room A) is replaced with a printer ID (e.g., a MAC address, an IP address, or other network unique ID), processing similar to the following processing can be realized.

As described above, each print job contains a user ID of a user who has issued the print job. Hence, in step S22, the CPU 212 transmits the collation data having been generated as illustrated in FIG. 14 to the conference room reservation management apparatus 100 to inquire about a time period during which the user having the user ID can use the network printer 5 in the conference room. In response to the inquiry, the conference room reservation management apparatus 100 determines whether the user ID of the user who has transmitted the print job is present in a usage permitted user ID list of a setup place of the network printer 5 (i.e., a request source) at the time when the print job is executed. The conference room reservation management apparatus 100 can perform the determination referring to the conference room reservation management table 706 illustrated in FIG. 6.

As a result of the determination, if the user having issued the print job is present in the usage permitted user ID list at the present time (i.e., time when the print job is to be processed), the conference room reservation management apparatus 100 informs the network printer 5 of a determination result that the user can use the network printer 5. If the usage permitted user ID list does not include the user ID, the conference room reservation management apparatus 100 informs the network printer 5 of a determination result that the user cannot use the network printer 5.

If the CPU 212 receives a response (i.e., determination result) from the conference room reservation management apparatus 100, then in step S23, the CPU 212 determines whether the current time is within a time period during which the user having transmitted the print job can use the network printer 5 based on the determination result. If the CPU 212 determines that the current time is within the usable time period (YES in step S23), the processing proceeds to step S24. If the CPU 212 determines that the current time is out of the usable time period (NO in step S23), the processing proceeds to step S26. In step S26, the CPU 212 deletes the print job selected in step S21 from the spooler. Alternatively, the CPU 212 can temporarily hold the print job in the spooler until the network printer 5 becomes available for the user. In any case, if an output of the print job is denied by the conference room reservation management apparatus 100, the network printer 5 does not output the input print job requested by the user 53 who is absent from the room 12.

In step S24, the CPU 212 requests conference room usage status determination to determine whether the user having the user ID can use the network printer 5 provided in the conference room to output the print job. The CPU 212 transmits the collation data having been generated as illustrated in FIG. 11 to the entry and exit management apparatus 101 to inquiry about the conference room usage status.

Figure 8:
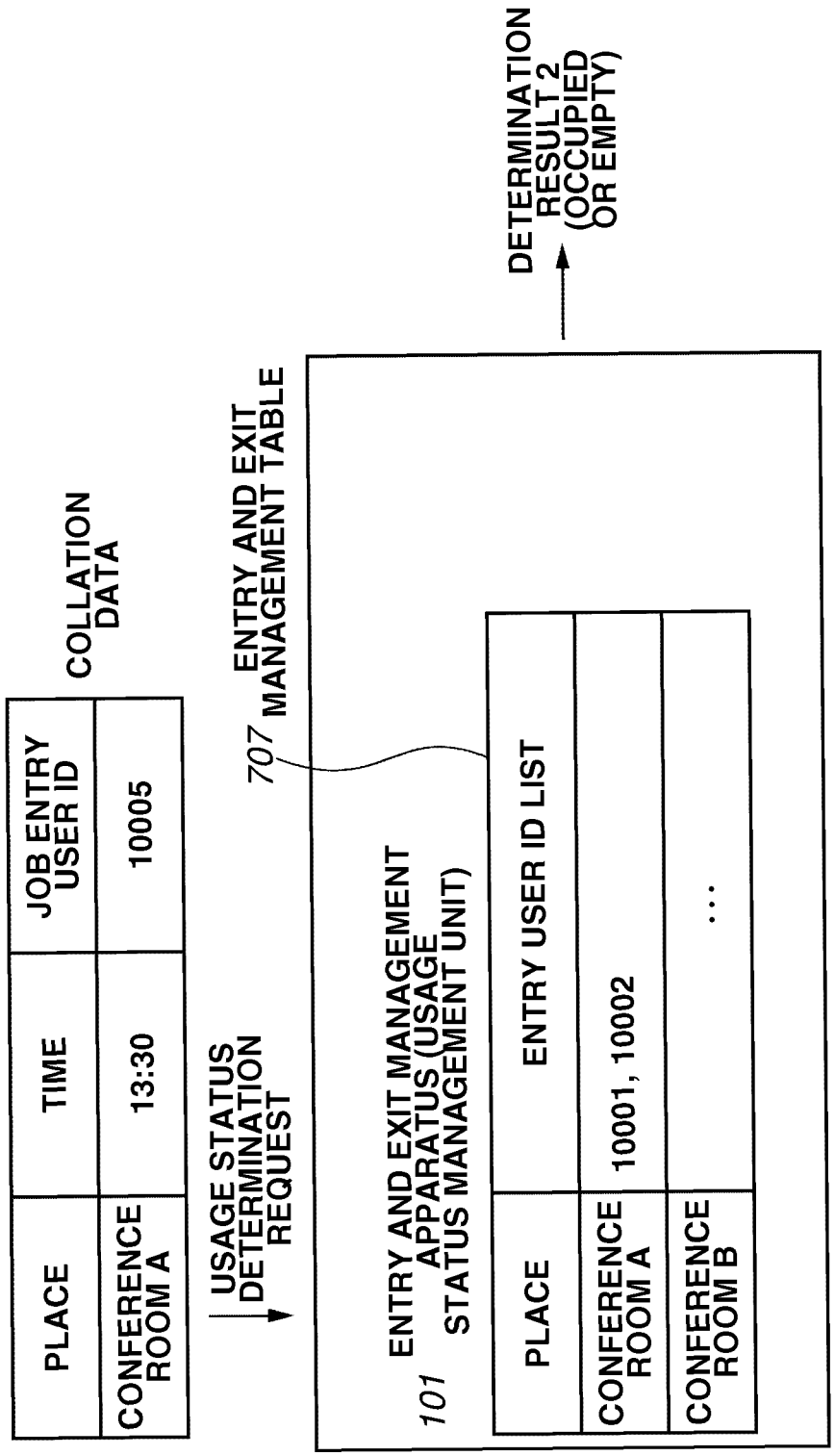
FIG. 8 illustrates an example of an entry and exit management table that can be managed by the entry and exit management apparatus illustrated in FIG. 1.

The entry and exit management apparatus 101, as illustrated in FIG. 8, determines whether the conference room (i.e., the setup place of the network printer 5 to which the user inputs the print job) is currently used by another user belonging to the same group member as the user having input the print job. The entry and exit management apparatus 101 can perform the determination by collating an entry user ID list at the present time with the usage permitted user ID list. As a result of the determination, if the user ID registered in the entry user ID list exists in the usage permitted user ID list, the entry and exit management apparatus 101 notifies the network printer 5 of a determination result "occupied." If the usage permitted user ID list does not include the user ID registered in the entry user ID list, the entry and exit management apparatus 101 notifies the network printer 5 of a determination result "empty (not used)."

In step S25, the CPU 212 determines whether the conference room is occupied based on the determination result received from the entry and exit management apparatus 101. If the CPU 212 determines that the conference room is occupied (YES in step S25), the processing proceeds to step S27. If the CPU 212 determines that the conference room is empty (NO in step S25), the processing proceeds to step S28.

As described above, in the present exemplary embodiment, only when the determination result in step S23 is "within usable time period" and the determination result in step S25 is "occupied", the processing proceeds to step S27 in which the CPU 212 executes the print job of the spooler to be executed. Then, the CPU 212 terminates the processing of the routine illustrated in FIG. 13B. As described above, if an output of the print job is permitted by the conference room reservation management apparatus 100, the network printer 5 outputs the input print job requested by the user 53 who is absent from the room 12.

If the CPU 212 determines that the conference room is empty (NO in step S25), then in step S28, the CPU 212 suspends the print job currently processed in the spooler 213 and shifts the print job to the latter stage of the queue. Then, the CPU 212 terminates the processing of the routine illustrated in FIG. 13B.

Figure 15A:
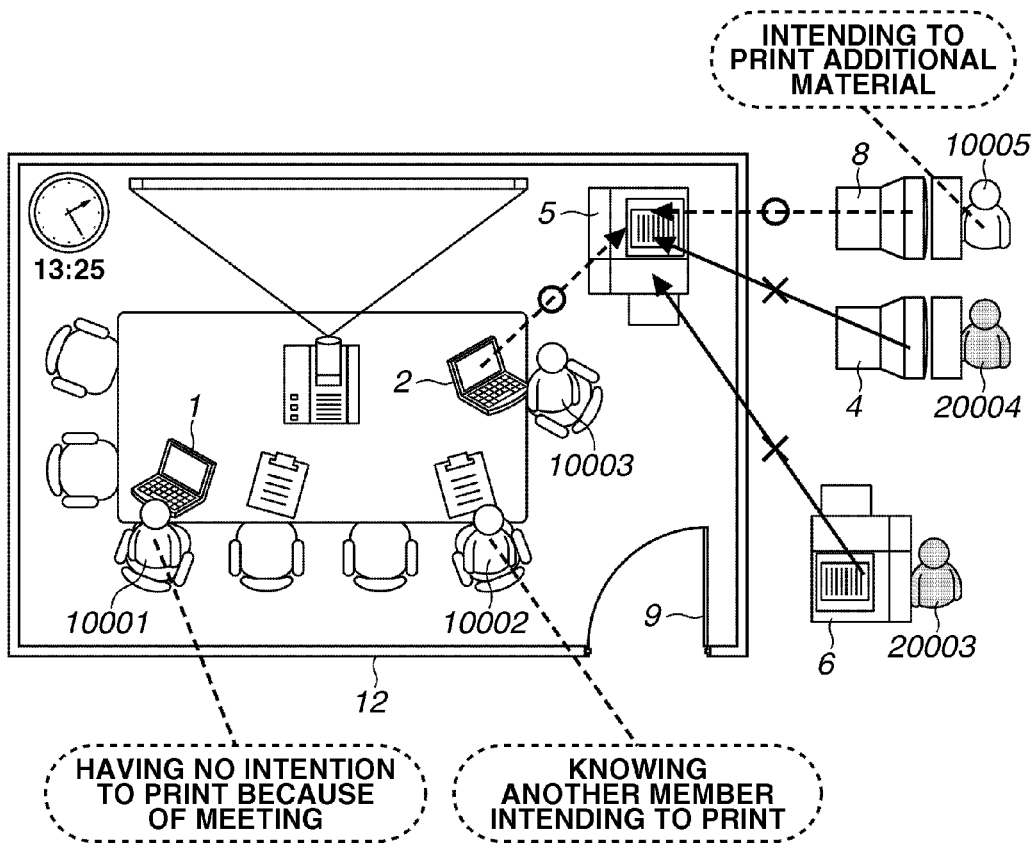
FIG. 15A illustrates a print job processing state of the network printer system illustrated in FIG. 1.
Figure 15B:
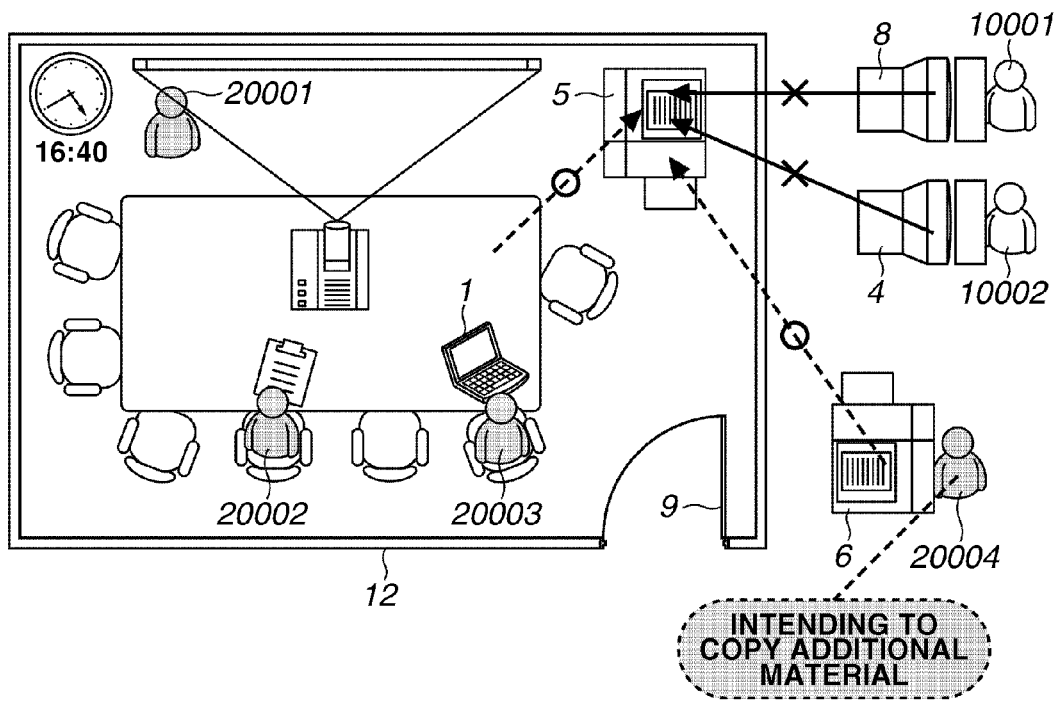
FIG. 15B illustrates a print job processing state of the network printer system illustrated in FIG. 1.

In the present exemplary embodiment, as illustrated in FIGS. 15A and 15B, in a state where a meeting (or conference) is held in the conference room during a time period reserved beforehand, the network printer 5 executes a print job if the print job is a job issued by a group member (i.e., a member corresponding to the conference participant) who has made a reservation for the conference room. On the other hand, the network printer 5 prohibits a print job from being executed if the print job is a job transmitted from a user other than the conference participant. More specifically, the network printer 5 suspends or discards the print job.

FIGS. 15A and 15B illustrate example print job request processing states of the network printer system illustrated in FIG. 1. FIG. 15A illustrates a state where users 10001 to 10005 of a group 1 member list registered in the usage permitted user ID list are permitted to use the conference room A during the time period of 13:00 to 15:00. FIG. 15B illustrates a state where users 20001 to 20004 of a group 2 member list registered in the usage permitted user ID list are permitted to use the conference room A during the time period of 15:00 to 17:00. In FIG. 15A, the user 10005 is absent from the room 12 and, from the outside, the user 10005 is requesting the network printer 5 to print an additional material. In this case, the user 10005 is included in the usage permitted user ID list illustrated in FIG. 15A. Therefore, the network printer 5 executes the requested print job in step S27.

Meanwhile, in a state illustrated in FIG. 15A, two users 20003 and 20004 of the group 2 member list request the network printer 5 to perform printing. However, at the present time (i.e., 13:25), the network printer 5 denies outputting print jobs requested by the users 20003 and 20004. Namely, the CPU 212 makes a denial determination (NO in step S23 in FIG. 13B and automatically deletes the requested print jobs from the spooler 213.

It may be useful to send an electronic mail that informs the deletion processing executed in step S26 to the users 20003 and 20004. In this case, it is also useful to add a reason why the deletion processing has been executed in step S26. The CPU 212 may temporarily spool the print jobs of the users 2003 and 2004 in the network printer 5. Then, the CPU 212 can execute the processing illustrated in FIG. 13B for the print jobs of the users 2003 and 2004 and can control the network printer 5 to output the print jobs when they become printable.

In the present exemplary embodiment, if the users 20003 and 20004 are permitted to enter and exit another room that is accessible via the network to the room 12, the users 2003 and user 2004 can use a network printer provided in this room to receive a print job and transfer the received print job to the network printer 5 in the room 12.

The above-described control brings the following effects. The network printer system according to the present exemplary embodiment can prevent the user 10005 from erroneously transmitting a print product from an external terminal (e.g., a computer 8 in another room) to the network printer 5 of the conference room A during a time period in which no meeting (or conference) is scheduled or held. Therefore, the present exemplary embodiment can prevent a print product output from the network printer 5 of the conference room A from being opened to unknown or unauthorized persons.

The network printer system according to the present exemplary embodiment can prevent the network printer 5 from outputting a print product if there is no permitted member (i.e., conference participant) in the conference room A even if the time is within a reserved time period. For example, in a case where a scheduled meeting is cancelled, the network printer 5 in the conference room A does not output any print product during the time period reserved for the meeting. Thus, in a case where the meeting is cancelled, the network printer system according to the present exemplary embodiment does not request a user to pick up a print product at the conference room A because the print product is not unnecessarily output by the network printer 5 in the conference room A at the time period set for the meeting.

If a conference participant is present in the conference room A, the network printer 5 permits execution of a print job transmitted from the user 10005. In this case, the user 10005 who is absent from the conference room A can request the network printer 5 in the conference room A to execute the print job. In this case, the network printer 5 can start processing of the print job transmitted from the computer 8 at earlier timing before the user 10005 arrives at the conference room A. Accordingly, the user 10005 can obtain a print product without waiting for a long time in the conference room A.

Figure 16A:
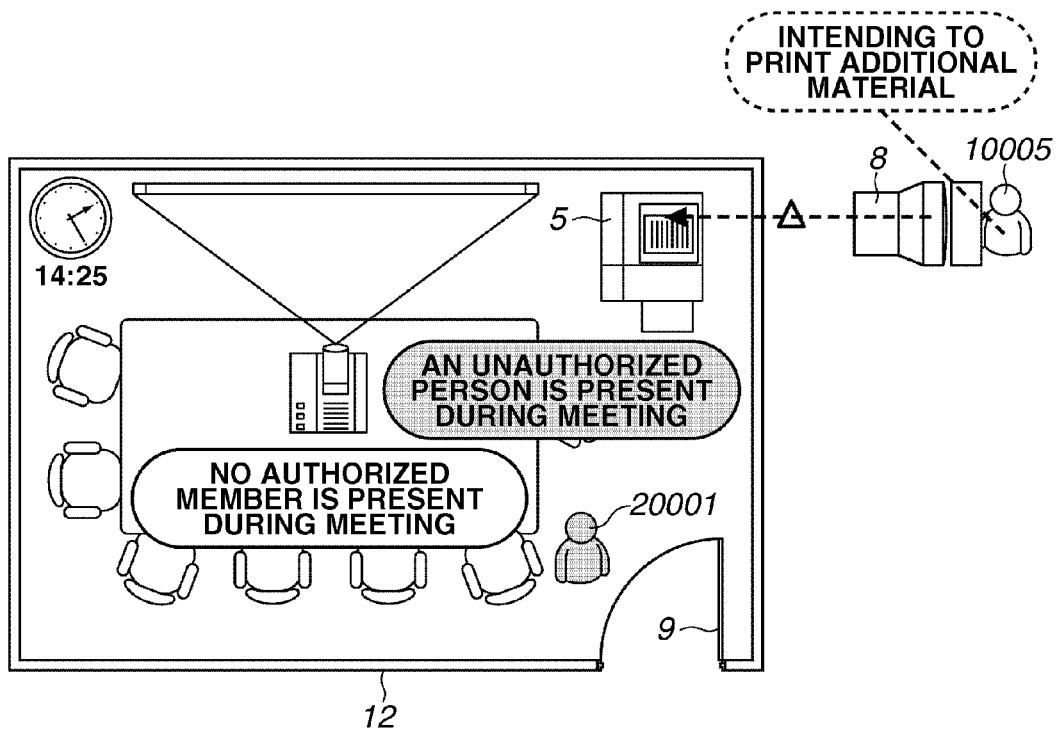
FIG. 16A illustrates a print job processing state of the network printer system illustrated in FIG. 1.
Figure 16B:
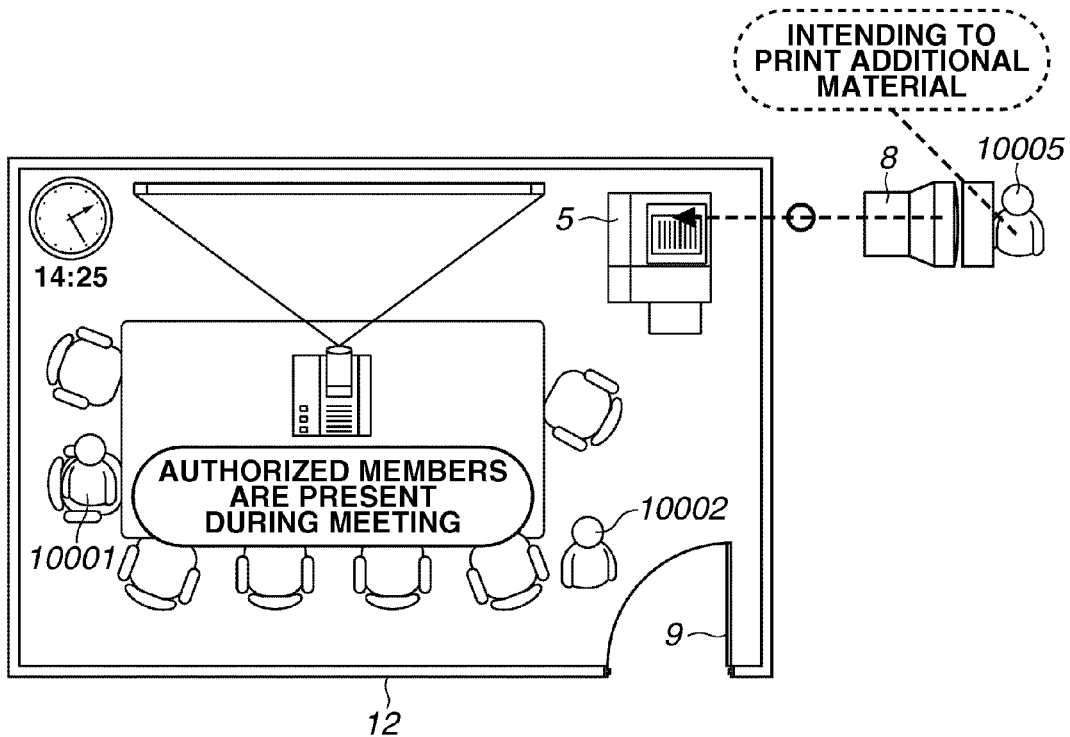
FIG. 16B illustrates a print job processing state of the network printer system illustrated in FIG. 1.

It is now assumed that, as illustrated in FIGS. 16A and 16B, the conference room A is reserved for a meeting (or conference) and the usage status of the conference room A is changed from "empty" to "occupied." In this case, a print job is suspended if the usage status of the conference room A is "empty" (i.e., if the group member who has made a reservation for the conference room is absent from the conference room A). However, the suspended print job can be executed if the usage status of the conference room A is changed to "occupied" (i.e., if the group member who has made a reservation for the conference room is present in the conference room A).

Figure 16C:
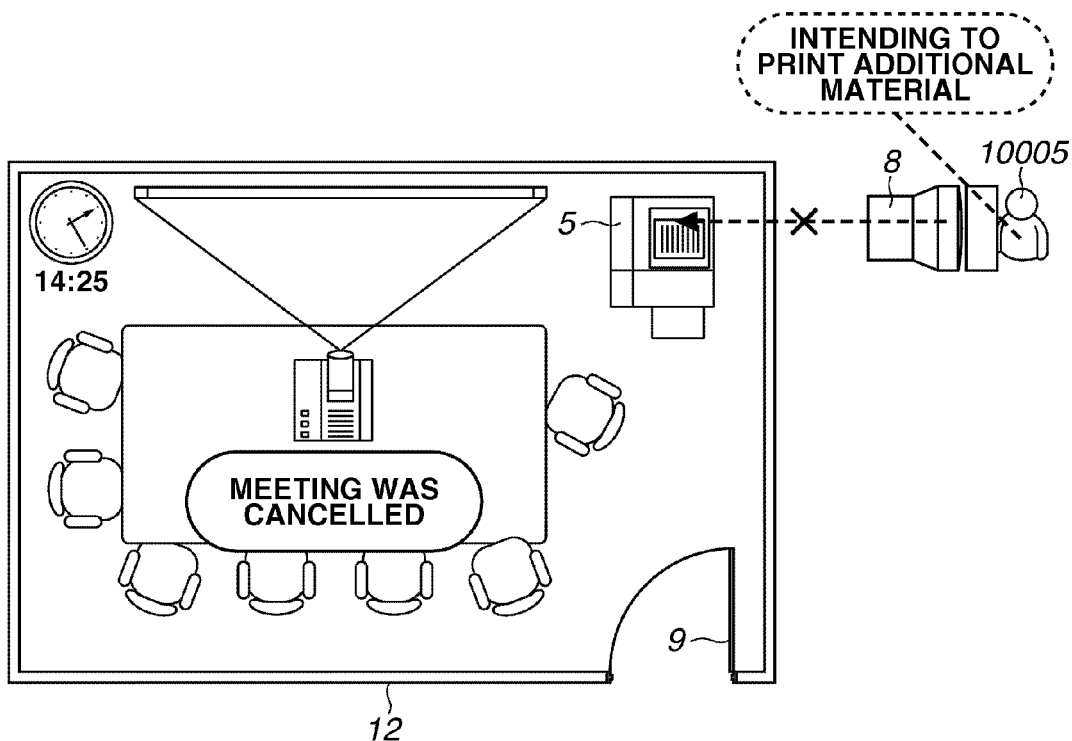
FIG. 16C illustrates a print job processing state of the network printer system illustrated in FIG. 1.

FIGS. 16A to 16C illustrate example print job processing states of the network printer system illustrated in FIG. 1. FIG. 16A illustrates a state where the users 10001 to 10005 of the group 1 member list registered in the usage permitted user ID list are permitted to use the conference room A during the time period of 13:00 to 15:00, although no group 1 member is present in the conference room A. In this case, in the processing procedure for the network printer 5 illustrated in FIG. 13B, the determination result in step S23 becomes YES and the determination result in step S25 becomes NO. More specifically, the network printer 5 suspends the print job transmitted from the user 10005.

FIG. 16B illustrates a state where two users 10001 and 10002 of the group 1 member list registered in the usage permitted user ID list are present in the conference room A in the time period of 13:00 to 15:00. In this situation, the network printer 5 can execute the suspended print job.

FIG. 16C illustrates a state where the reservation for the conference room A was cancelled. In a case where a conference room reservation is made for the room 12 as illustrated in FIG. 16A and reservation content for the conference room A is later cancelled as illustrated in FIG. 16C, the CPU 212 performs the following control. The CPU 212 temporarily holds the print job in the spooler 213 if the reservation content for the conference room A is not cancelled. On the other hand, the CPU 212 deletes the print job that is temporarily held in the spooler 213 at the time when the reservation content for the conference room A is cancelled.

Example processing that can be performed by the conference room reservation management apparatus 100 is described below with reference to the flowcharts illustrated in FIGS. 17A and 17B.

FIG. 17A is a flowchart illustrating an example procedure of data processing that can be executed by the conference reservation management apparatus 100 illustrated in FIG. 1. To realize the steps illustrated in FIG. 17A, the CPU 231 of the conference reservation management apparatus 100 can execute a control program stored in the ROM 234 that can be loaded into the RAM 235 when it is executed.

Instep S30, the CPU 231 determines whether conference room reservation data is received from any client computer connected to the network 11 via the communication unit 233. If the CPU 231 receives information from the client computer (YES is step S30), then in step S31, the CPU 231 updates conference room reservation data managed by the reservation information storage unit 232 and terminates the processing of the routine illustrated in FIG. 17A.

Figure 17B:
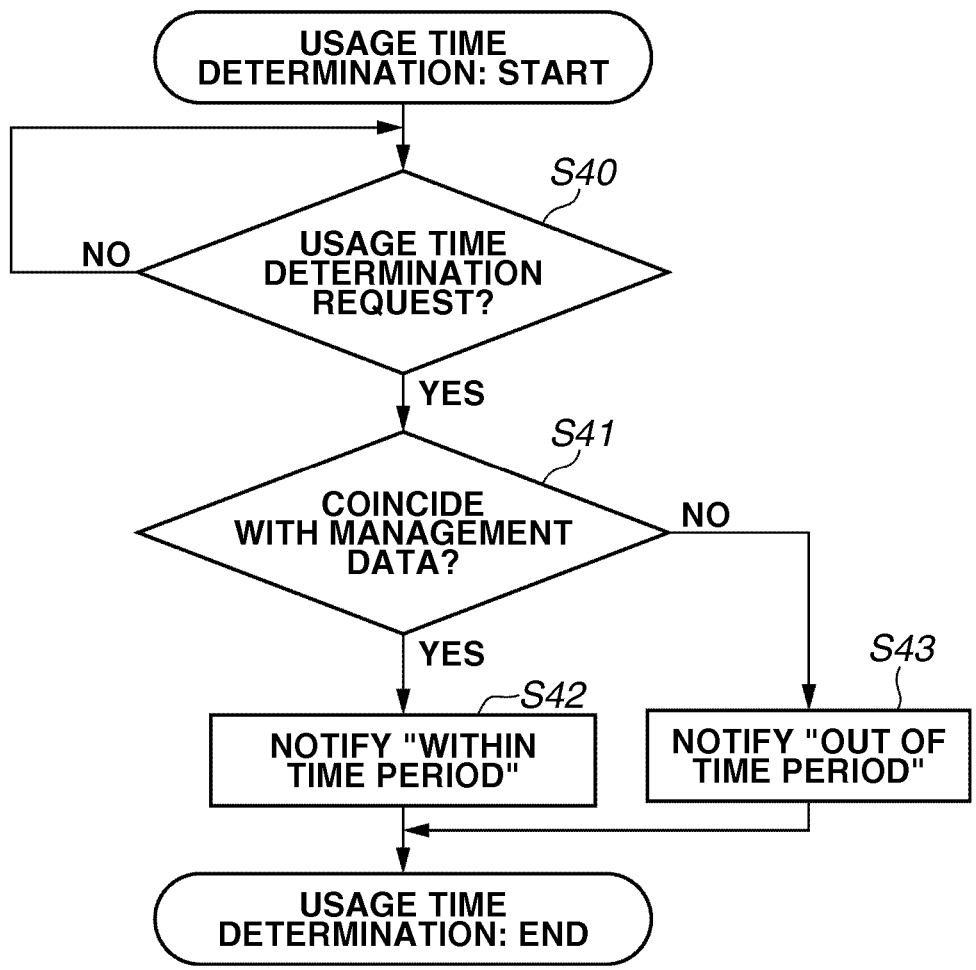
FIG. 17B is a flowchart illustrating an example procedure of data processing that can be executed by the conference reservation management apparatus illustrated in FIG. 1.

FIG. 17B is a flowchart illustrating an example procedure of data processing that can be executed by the conference reservation management apparatus 100 illustrated in FIG. 1. The processing illustrated in FIG. 17B corresponds to usage time determination processing that can be executed by the conference reservation management apparatus 100. To realize the steps illustrated in FIG. 17B, the CPU 231 of the conference reservation management apparatus 100 can execute a control program stored in the ROM 234 that can be loaded into the RAM 235 when it is executed.

In step S40, the CPU 231 determines whether an inquiry about the usage time of the room 12 (see step S22) is received from the network printer 5 via the communication unit 233. If the CPU 231 receives a usage time determination request from the network printer 5 (YES in step S40), then in step S41, the CPU 231 determines whether a usage time period of the network printer 5 located in the room 12 coincides with the reservation content for the room 12. More specifically, the CPU 231 determines whether the time when a user inputs a print job is within a time period during which the network printer 5 in the room 12 is in a usable state. As an example determination method, the CPU 231 can determine whether the print job entry time (i.e., the time when the print job is input) is within the conference room reservation time period. Alternatively, it may be useful to set a print job permitted time period that starts a predetermined time earlier than the conference room reservation time period and thoroughly includes conference room reservation time. In this case, the CPU 231 can determine whether the print job entry time is within the print job permitted time period.

If the CPU 231 determines that the print job entry time is within the conference room reservation time period or the print job permitted time period (YES in step S41), the processing proceeds to step S42. In step S42, the CPU 231 transmits, the communication unit 233, a determination result indicating "within time period" to the network printer 5 (i.e., the request source) connected to the network 11 and terminates the processing of the routine illustrated in FIG. 17B.

If the CPU 231 determines that the print job entry time is not within the conference room reservation time period or the print job permitted time period (NO in step S41), the processing proceeds to step S43.

In step S43, the CPU 231 transmits a determination result indicating "out of time period" to the network printer 5 (i.e., the request source) and terminates the processing of the routine illustrated in FIG. 17B. If the determination result indicates "out of time period", the network printer 5 can delete or suspend the requested print job. In a case where the network printer 5 suspends the requested print job, the network printer 5 can receive information indicating a print permitted time period from the conference room reservation management apparatus 100 and can execute the processing of step S24 and subsequent steps illustrated in FIG. 13B when the network printer 5 becomes available.

Example processing that can be executed by the entry and exit management apparatus 101 is described below with reference to FIGS. 18A and 18B.

FIG. 18A is a flowchart illustrating an example procedure of data processing that can be executed by the entry and exit management apparatus 101 illustrated in FIG. 1. The processing illustrated in FIG. 18A corresponds to the entry and exit management processing that can be executed by the entry and exit management apparatus 101. To realize the processing of steps illustrated in FIG. 18A, the CPU 221 of the entry and exit management apparatus 101 can execute a control program stored in the ROM 224 that can be loaded into the RAM 225 when it is executed.

In step S50, the CPU 221 determines whether IC card information read by the lock device 7 (e.g., user ID information or lock device information) is received. If the CPU 221 determines that the IC card information read by the lock device 7 is received (YES in step S50), the processing proceeds to step S51.

In step S51, the CPU 221 identifies a room ID of a place (i.e., room) where the lock device 7 (i.e., the transmission source) is present referring to the lock device ID table 702 illustrated in FIG. 2B. In step S52, the CPU 221 reads data corresponding to the received user ID in the user position table 701 illustrated in FIG. 2A and determines whether the user is present in or absent from the room.

In step S53, the CPU 221 determines whether a user having the user ID is permitted to enter the specified room. If the CPU 221 determines that the user is permitted to enter the room (YES in step S53), then in step S54, the CPU 221 notifies the lock device 7 (i.e., the transmission source) of door unlock permission.

If the CPU 221 determines that the user is not permitted to enter the room (NO in step S53), then in step S55, the CPU 221 transmits unlock prohibition information or no information to the lock device 7.

In step S56, the CPU 221 updates the "present position" field of the user position table 701 referring to the information indicating the reading source (i.e., the indoor card reader or the outdoor card reader). Then, the CPU 221 terminates the processing of the routine illustrated in FIG. 18A.

If the reading source is the outdoor card reader, it can be presumed that the user is present in the room. Therefore, the CPU 221 stores the room ID of the room in the "present position" of the user position table 701. On the other hand, if the reading source is the indoor card reader, the CPU 221 stores a special ID indicating "unknown" in the "present position" of the user position table 701.

Figure 18B:
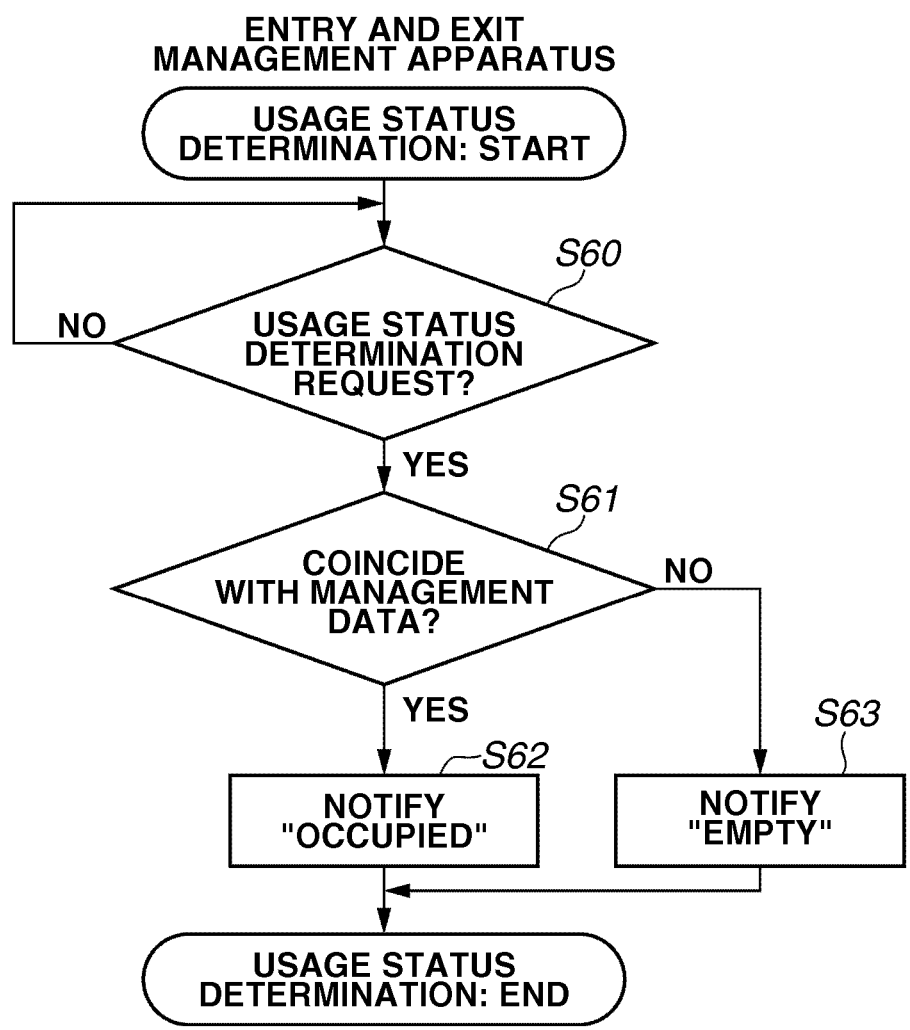
FIG. 18B is a flowchart illustrating an example procedure of data processing that can be executed by the entry and exit management apparatus illustrated in FIG. 1.

FIG. 18B is a flowchart illustrating an example procedure of data processing that can be executed by the entry and exit management apparatus 101 illustrated in FIG. 1. The processing illustrated in FIG. 18B corresponds to usage status determination processing that can be executed by the entry and exit management apparatus 101. To realize the processing in steps illustrated in FIG. 18A, the CPU 221 of the entry and exit management apparatus 101 can execute a control program stored in the ROM 224 that can be loaded into the RAM 225 when it is executed.

In step S60, the CPU 221 determines whether an inquiry about the usage status of the conference room 12 is received via the communication unit 233 from the network printer 5 connected to the network 11. If the CPU 221 receives a usage status determination request from the network printer 5, the processing proceeds to step S61.

In step S61, the CPU 221 determines whether a usage status of the conference room coincides with the conference room reservation content (i.e., management data). In other words, the CPU 221 determines whether any one of members belonging to the same group identified by the user ID is present in the conference room in which the network printer 5 (i.e., inquiry source) is provided.

Alternatively, the CPU 221 can determine that the conference room is occupied only when the users in the conference room are limited to the group members. In other words, the CPU 221 does not notify the determination result "occupied" if any other user not belonging to the permitted group is present in the conference room. In this case, the network printer 5 does not perform printing to prevent a print product from being viewed by user not belonging to the permitted group. Therefore, the present exemplary embodiment can enhance the security.

If the CPU 221 determines that the conference room is occupied by the members belonging to the same group as the user having input the print job (YES in step S61), then in step S62, the CPU 221 notifies the network printer 5 (i.e., the request source) of a determination result "occupied." Then, the CPU 221 terminates the processing of the routine illustrated in FIG. 18B.

If the CPU 221 determines that the conference room is not occupied by the members belonging to the same group as the user having input the print job (NO in step S61), then in step S63, the CPU 221 notifies the network printer 5 (i.e., the request source) of a determination result "empty." Then, the CPU 221 terminates the processing of the routine illustrated in FIG. 18B.

As described above, in the present exemplary embodiment, the network printer 5 performs printing only when it is determined that the conference room is occupied by the members belonging to the same group as the user having input the print job. Therefore, the present exemplary embodiment can restrict the network printer 5 from outputting a print product in a situation where no group member who has requested the print job is absent from the conference room. Therefore, the present exemplary embodiment can prevent an output print product from been stolen or viewed with malicious intent.

Figure 19:
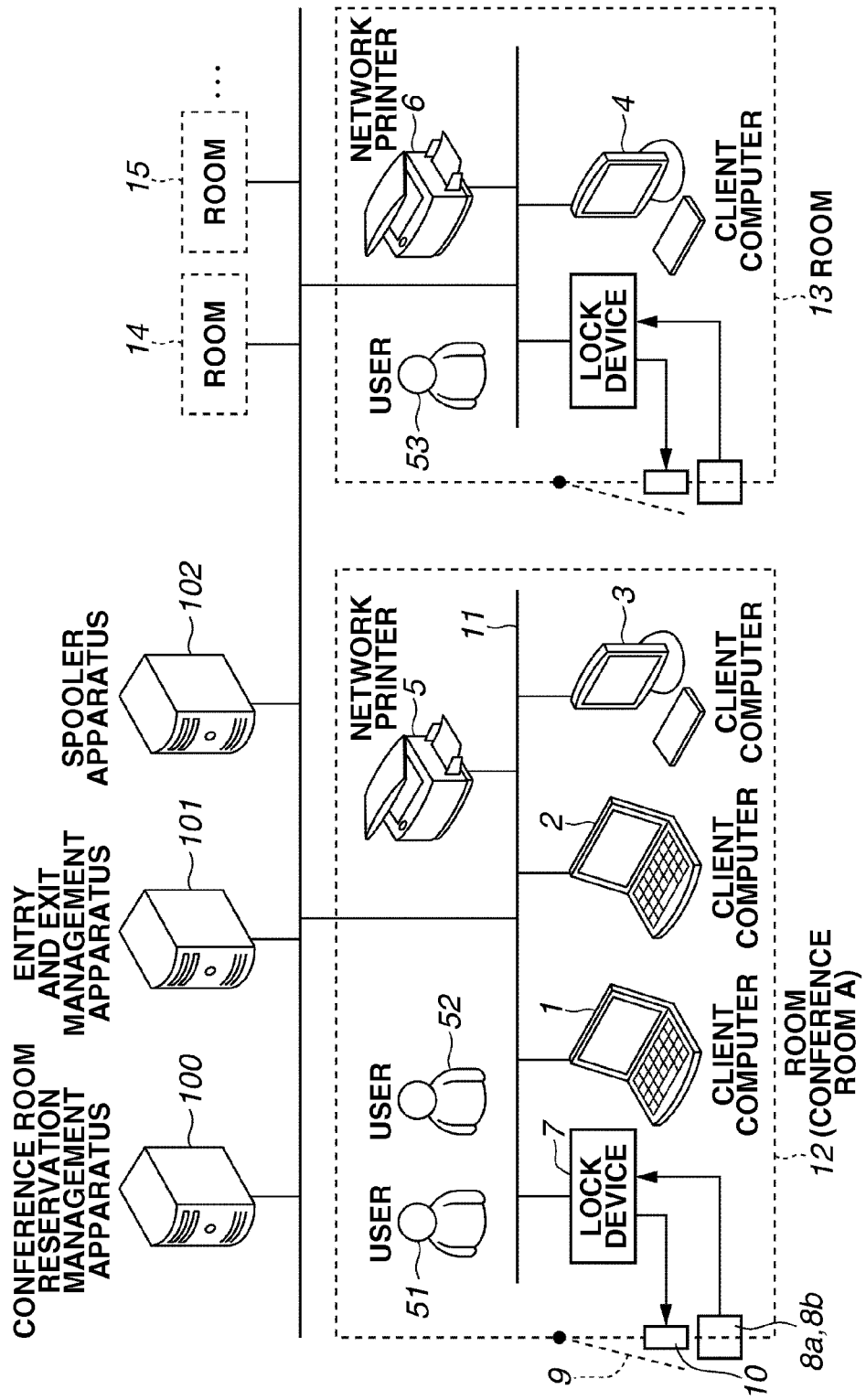
FIG. 19 illustrates a configuration of the network printing system according to an exemplary embodiment of the present invention.

In the above-described exemplary embodiment, the network printer 5 manages print jobs. However, as illustrated in FIG. 19, a spooler apparatus 102 having a configuration similar to the client computer 1 can be connected to the network 11. The spooler apparatus 102 can store and manage all print jobs so that the network printer 5 can successively output print jobs if they are determined as printable.

In this case, the spooler apparatus 102 can realize a function similar to that of the spooler 213 of the network printer. The spooler apparatus 102 can temporarily store print jobs having been issued by respective client computers 1 to 4 and can cause any one of network printers to output a print job.

The present exemplary embodiment can control the network printer in the conference room so as not to execute a print job if the print job is input by a non-permitted user. Therefore, for example, the present exemplary embodiment can prevent a meeting (or conference) from being interrupted or obstructed by printing sounds generated by the network printer that outputs a print job requested by other user (e.g., a member having made a reservation for the next scheduled conference).

The network printer 5 may execute a print job if the member having transmitted the print job is present in the conference room where the network printer 5 is located even if this member is not registered as a group member. Therefore, in a case where a non-registered member enters the conference room as a guest of the conference, the network printer 5 can output a print product without any restrictions according to a request of the non-registered member. The network printer 5 can inquire the entry and exit management apparatus 101 about the presence of the non-registered member in the conference room in which the network printer 5 is located based on an ID of the non-registered member that is required in the log-in processing.

In the above-described first exemplary embodiment, the entry and exit management apparatus includes the IC card reader to detect the present position of each user. However, the present invention is not limited to the above-described exemplary embodiment. For example, an in-house personal handy phone (i.e., PHS) position information system can be used to detect the present position of each user.

The in-house PHS position information system includes PHS antennas that may be located at various places (e.g., offices, conference rooms, experiment rooms, passageways, gardens, parking lots, etc.) in a company or an appropriate size of facility. The system can detect a field intensity of each PHS terminal through the PHS antennas at predetermined time intervals (e.g., several seconds to 1 minute), and can calculate the present position of each user based on the detected field intensity of the PHS. The system can use position information obtained from a PHS terminal as presence/absence information of a PHS owner, congestion information, and currently present user specifying information.

An example network printing system according to an exemplary embodiment, which includes the above-described in-house PHS position information system, is described below with reference to FIG. 20.

Figure 20:
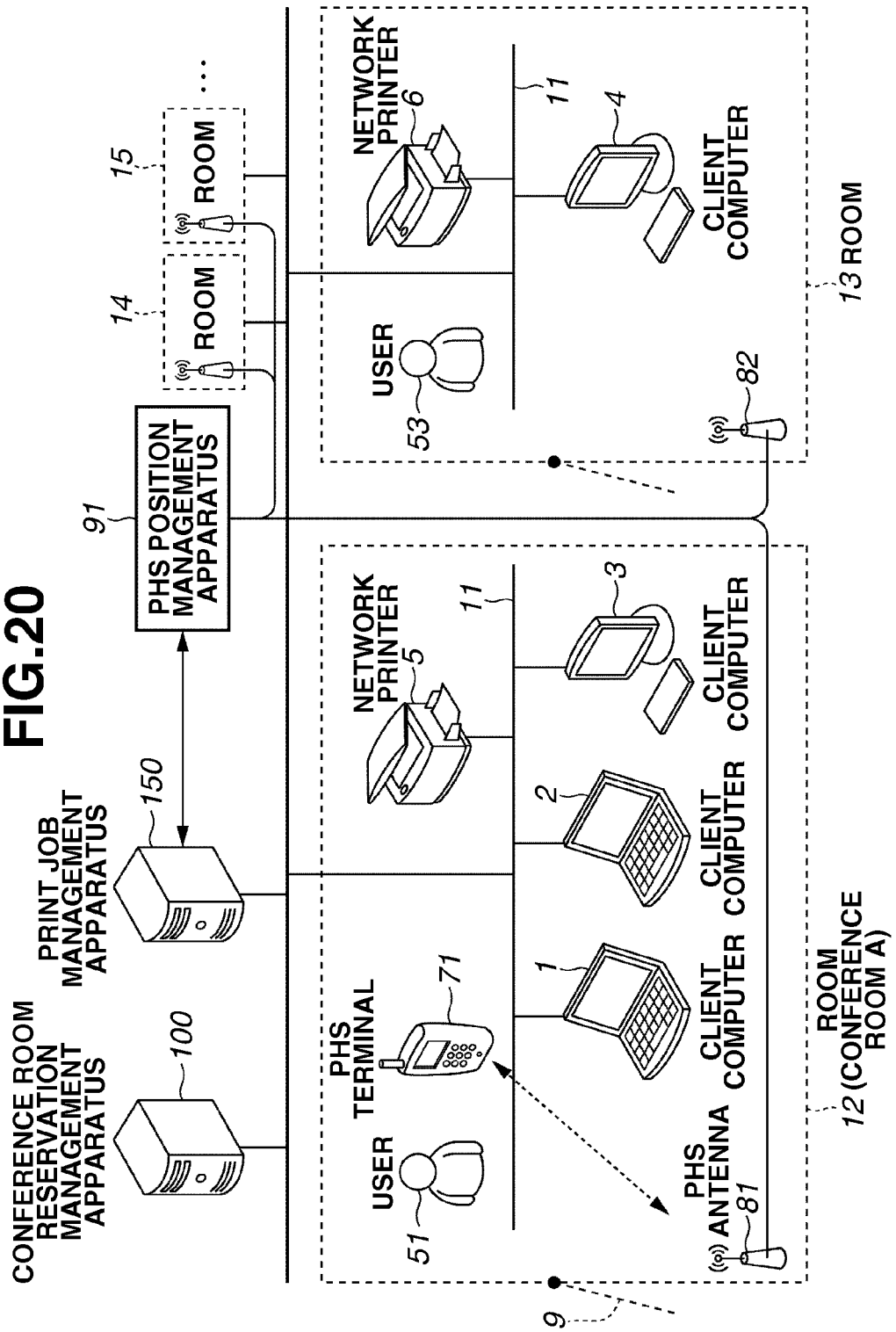
FIG. 20 illustrates a configuration of the network printing system according to an exemplary embodiment of the present invention.

FIG. 20 illustrates a configuration of a network printing system according to an exemplary embodiment of the present invention. Components similar to those illustrated in FIG. 1 are denoted by the same reference numerals.

In FIG. 20, a print job management apparatus 150 can perform processing similar to that performed by the entry and exit management apparatus 101 illustrated in FIG. 1. A PHS position management apparatus 91 is connected to base stations 81, 82, . . . , provided at predetermined positions in respective rooms, to detect the presence of a PHS terminal 71 of the user 51. Each base station is equipped with an antenna.

Similar to the above-described entry and exit management apparatus 100, the print job management apparatus 150 can perform print permission/prohibition determination for a print job identified by a user ID in response to an inquiry from the printer.

In the present exemplary embodiment, the user position can be detected based on the position of a PHS terminal belonging to the user. Therefore, the print job management apparatus 150 performs the print permission/prohibition determination based on information received from the PHS position management apparatus 91.

The information received from the PHS position management apparatus 91 is information identifying a base station that is positioned closest to the PHS terminal 71. Therefore, the print job management apparatus 150 requires a conversion table to obtain a geographical position of the PHS terminal 71 based on the information of the identified base station.

For example, the conversion table defines a relationship between the base station ID and the room ID. In this case, if no printer is located in a passageway, a room ID field may include a specific ID allocated to the base station installed in the passageway.

The print job management apparatus 150 further requires a table defining a relationship between a telephone number (or an extension number) of the PHS terminal 71 and a network user ID.

In the present exemplary embodiment, the print job management apparatus 150 includes a newly added conversion table to obtain a geographical position of the PHS terminal 71 based on the information of the identified base station. The print job management apparatus 150 recognizes the position of the network printer 5 (i.e., the request source) based on the conversion table if the print job management apparatus 150 receives an inquiry from the network printer 5. Then, the print job management apparatus 150 acquires a group member list of users who have made a reservation for the room 12(i.e., the conference room A) that is located within a predetermined range from the position of the network printer 5. The print job management apparatus 150 further collates the user ID of the user who owns the PHS terminal that is present in the room 12 located within the predetermined range from the position of the network printer 5 (i.e., the request source). Based on the results obtained in this manner, the print job management apparatus 150 transmits print permission/prohibition information to the network printer 5.

The above-described configuration can be modified in the following manner. When a user instructs an issuance of a print job via the client computer, the client computer notifies a user ID to the print job management apparatus 150. The print job management apparatus 150 allocates an identification number (ID:xxxxxxx) to a print job to be issued and transmits the allocated identification number to the client computer. The client computer notifies the user of the identification number received from the print job management apparatus 150, as a receipt number. For example, if the identification information is a pseudo random number of 128-bit, it can be effectively used in the present system.

The client computer allocates a user ID and a job identification number to the print job and transmits the print job to the network printer 5.

After the network printer 5 receives the print job, the network printer 5 notifies the print job management apparatus 150 of present status information at appropriate timing. The status information may include the identification number of the print job, the user ID, print completion information, and print prohibition information.

The print job management apparatus 150 can register a mail address of the PHS for each user ID.

Therefore, the print job management apparatus 150 can notify each user of the following information. For example, if the print job management apparatus 150 receives an issuance notice of a print job from the client computer, the print job management apparatus 150 identifies the mail address of a PHS based on the user ID attached to the issuance notice of the print job. The job management apparatus 150 sends an electronic mail including the following message to the identified mail address of the PHS. For example, an example content of the message is "Your print job (ID:XXXXXX) is received. Please pay attention to any message if transmitted."

If the print processing of the print job is started (or resumed), the print job management apparatus 150 transmits a message "Printing of your transmitted print job (ID: XXXXXX) is started."

In addition, after the print processing is completed, the print job management apparatus 150 periodically sends a message "A print output of your transmitted print job (ID: XXXXXX) has been completed. Please pick up the printed sheets at the printer, as soon as possible. This message will be periodically transmitted until the print job ID:XXXXXX is input to the printer." to the PHS terminal.

The above-described respective messages can be stored beforehand in the print job management apparatus 150. The print job management apparatus 150 replaces a portion corresponding to "XXXXXX" of the print job ID(XXXXXX) with an actually issued job identification number. Then, the print job management apparatus 150 identifies a mail address of the PHS based on the user ID and attaches message information to an electronic mail, which can be transmitted via the network (not illustrated) based on the mail address. The PHS terminal has a mail function. The PHS terminal can be replaced with a cellular phone or any other wireless communication device that has a mail function.

As described above, the present exemplary embodiment can perform appropriate control for a print job according to the place where a user having transmitted the print job is present. In addition, the present exemplary embodiment enables the user to adequately check a print status of the transmitted print job at an arbitrary place in a company or facility. Therefore, the present exemplary embodiment can prevent printed sheets (i.e., a print product) from being left on a discharge tray for a long time. As a result, the present exemplary embodiment can prevent the print product from being stolen or erroneously picked up by another user.

An example configuration of data processing programs readable by the network printing system according to an exemplary embodiment of the present invention is described below with reference to a memory map illustrated in FIG. 21. A storage medium can store program code that can be read by respective CPUs of the client computers 1 to 4, the network printers 5 and 6, the conference room reservation management apparatus, and the entry and exit management apparatus. However, the program code that can be read by respective apparatuses may be separately stored in different storage media.

Although not illustrated in the drawings, the storage medium can store management information for the program code stored in the storage medium, such as version information and creator name, as well as information relevant to the OS that reads the programs, e.g., icons discriminately displaying the programs.

Further, a directory of the above-described storage medium can manage data belonging to various programs. Moreover, the storage medium can store a program to be used to install various programs on a computer and a decompression program if the installed program is compressed.

A host computer can execute a program installed from the outside to realize the functions indicated in FIGS. 10, 11A, 11B, 13A, 13B, 17A, 17B, 18A, and 18B according to the present exemplary embodiment. In this case, the present invention is applicable when an information group including the program is supplied from an external storage medium to an output apparatus using an appropriate storage medium (e.g., CD-ROM, flash memory, and FD) or via a network.

A storage medium storing software program code for realizing the functions of the above-described exemplary embodiments can be supplied to a system or an apparatus. A computer (or a CPU or a micro-processing unit (MPU)) in the system or the apparatus can read and execute the program code to realize the functions of the above-described exemplary embodiments.

In this case, the program code itself read out of the computer-reading storage medium can realize novel functions of the exemplary embodiments of the present invention. The storage medium storing the program code constitutes the present invention.

Accordingly, equivalents of programs (e.g., object code, interpreter program, and OS script data) are usable if they possess comparable functions.

A storage medium supplying the program can be selected from any one of a floppy disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a digital versatile disc (DVD (DVD-ROM, DVD-R)).

In this case, the program code itself read out of the storage medium realizes the functions of the above-described exemplary embodiments. The storage medium storing the program code constitutes the present invention.

The method for supplying the program includes accessing a website on the Internet using the browsing function of a client computer, when the website allows each user to download the computer program of the present invention, or compressed files of the programs having automatic installing functions, to a hard disk or other recording medium of the user. Furthermore, the program code constituting the program according to the exemplary embodiments of the present invention is dividable into a plurality of files so that respective files are downloadable from different websites. Namely, the present invention encompasses World Wide Web (WWW) servers and File Transfer Protocol (FTP) servers that allow numerous users to download the program files so that their computers can realize the functions or processes according to the exemplary embodiments of the present invention.

Moreover, enciphering the program according to the exemplary embodiments of the present invention and storing the enciphered program on a CD-ROM or comparable storage medium is an exemplary method when the program is distributed to users. The authorized users (i.e., users satisfying predetermined conditions) are allowed to download key information from a website on the Internet. The users can decipher the program with the obtained key information and can install the program on their computers. When the computer executes the installed program, the computer can realize the functions of the above-described exemplary embodiments.

The present invention is not limited to the exemplary embodiment that is realized by the computer that reads and executes the program code. For example, an operating system (OS) or other application software running on a computer can execute part or all of actual processing based on instructions of the programs to realize the functions of the above-described exemplary embodiments.

Additionally, the program code read out of a storage medium can be written into a memory of a function expansion board inserted in a computer or into a memory of a function expansion unit connected to the computer. In this case, based on instructions of the program, a CPU provided on the function expansion board or the function expansion unit can execute part or all of the processing to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-189548 filed Jul. 23, 2008, which is hereby incorporated by reference herein in its entirety.

What is claimed is:

1. An image forming apparatus comprising:
a first determining unit configured to determine whether current time is within a usage time period within which a user having issued a print job is permitted to use a room in which the image forming apparatus is provided;
a second determining unit configured to determine whether a user who is permitted to use the room within the usage time period exists in the room; and
an output control unit configured to output the print job if the first determining unit determines that the current time is within the usage time period and the second determining unit determines that the permitted user exists in the room, and configured to restrict an output of the print job if the first determining unit determines that the current time is not within the usage time period or the second determining unit determines that the permitted user does not exist in the room.

2. The image forming apparatus according to claim 1, wherein the second determining unit is configured to determine whether only the user who is permitted to use the room within the usage time period exists in the room.

3. The image forming apparatus according to claim 1, wherein the second determining unit is configured to determine whether the user who is permitted to use the room within the usage time period and a person other than the permitted user exist in the room.

4. The image forming apparatus according to claim 1, wherein the output control unit is configured to restrict an output of the print job in response to the second determining unit determining that the permitted user does not exist in the room while the first determining unit determines that the current time is within the usage time period.

5. The image forming apparatus according to claim 1, wherein the output control unit is configured to delete the print job in response to the second determining unit determining that the permitted user does not exist in the room.

6. The image forming apparatus according to claim 1, wherein the output control unit is configured to delete the print job in response to the first determining unit determining that the current time is not within the usage time period.

7. The image forming apparatus according to claim 1, wherein the output control unit is configured to shift the print job to a latter stage of a queue of print jobs in response to the second determining unit determining that the permitted user does not exist in the room while first determining unit determines that the current time is within the usage time period.

8. The image forming apparatus according to claim 1, wherein the first determining unit inquires of a management apparatus for managing a reservation of the room whether the current time is within the usage time period while which the user having issued the print job is permitted to use the room.

9. The image forming apparatus according to claim 1, further comprising:
a receiving unit configured to receive the print job and user identification information for identifying the user having issued the print job from a client computer,
wherein the first determining unit transmits the user identification information to a management apparatus in order to inquire whether the current time is within the usage time period while which the user identified by the user identification information is permitted to use the room.

10. The image forming apparatus according to claim 1, wherein the second determining unit inquires of a management apparatus for managing an entry or exit state of a user whether the user who is permitted to use the room within the usage time period exists in the room.

11. A method for controlling an image forming apparatus, the method comprising:
determining whether current time is within a usage time period within which a user having issued a print job is permitted to use a room in which the image forming apparatus is provided;
determining whether a user who is permitted to use the room; within the usage time period exists in the room; and
outputting the print job if it is determined that the current time is within the usage time period and it is determined that the permitted user exists in the room, and restricting an output of the print job if it is determined that the current time is not within the usage time period or it is determined that the permitted user does not exist in the room.

12. A non-transitory computer readable storage medium storing a computer executable program causing an image forming apparatus to perform the method according to claim 11.

* * * * *